(12) United States Patent
Khoo et al.

(10) Patent No.: US 9,326,557 B2
(45) Date of Patent: May 3, 2016

(54) VULCANIZATION ACCELERATOR- AND SULFUR-FREE ELASTOMER RUBBER GLOVE FOR CLEAN ROOMS

(75) Inventors: Siong Hui Khoo, Kuantan (MY); Lawrence Siau Tian Lim, Klang (MY); Seek Ping Lee, Petaling Jaya (MY); Eng Long Ong, Petaling Jaya (MY); Norihide Enomoto, Tokyo (JP)

(73) Assignees: KOSSAN SDN BHD, Klang (MY); MIDORI ANZEN CO., LTD, Tokyo (JP)

( * ) Notice: Subject to any disclaimer, the term of this patent is extended or adjusted under 35 U.S.C. 154(b) by 34 days.

(21) Appl. No.: 13/877,054

(22) PCT Filed: Sep. 30, 2011

(86) PCT No.: PCT/JP2011/073270
§ 371 (c)(1),
(2), (4) Date: Mar. 29, 2013

(87) PCT Pub. No.: WO2012/043893
PCT Pub. Date: Apr. 5, 2012

(65) Prior Publication Data
US 2013/0191964 A1 Aug. 1, 2013

(30) Foreign Application Priority Data
Sep. 30, 2010 (JP) ................. 2010-221263

(51) Int. Cl.
*A41D 19/00* (2006.01)
*C08F 236/14* (2006.01)
*C08L 9/02* (2006.01)
*B29D 99/00* (2010.01)
*C08K 3/22* (2006.01)
*C08L 13/00* (2006.01)

(52) U.S. Cl.
CPC ........ *A41D 19/0055* (2013.01); *B29D 99/0067* (2013.01); *C08F 236/14* (2013.01); *C08K 3/22* (2013.01); *C08L 9/02* (2013.01); *C08L 13/00* (2013.01); *A41D 19/0062* (2013.01)

(58) Field of Classification Search
CPC ..... C08F 236/14; C08L 113/00; C08L 19/02; C08K 3/22; A41D 19/005; A41D 19/0062; B29D 99/0067
USPC .............. 2/168, 169; 525/326.1, 329.3, 330.2
See application file for complete search history.

(56) References Cited

U.S. PATENT DOCUMENTS

| 5,910,533 | A | 6/1999 | Ghosal et al. |
| 6,347,408 | B1 | 2/2002 | Yeh |
| 6,673,871 | B2 | 1/2004 | Warneke et al. |
| 2006/0253956 | A1 | 11/2006 | Lipinski |
| 2006/0257674 | A1 | 11/2006 | Lipinski |
| 2008/0139723 | A1 | 6/2008 | Foo |
| 2012/0246799 | A1 | 10/2012 | Khoo et al. |

FOREIGN PATENT DOCUMENTS

| JP | 7-506642 | A | 7/1995 |
| JP | 2001-527092 | A | 12/2001 |
| JP | 2002-528659 | A | 9/2002 |
| JP | 2004-526063 | A | 8/2004 |
| JP | 2007-153948 | A | 6/2007 |
| JP | 2008-545814 | A | 12/2008 |
| JP | 2009-501833 | A | 1/2009 |
| WO | 94-20574 | A2 | 9/1994 |
| WO | WO-2011068394 | A1 * | 6/2011 |

OTHER PUBLICATIONS

International Search Report for PCT/JP2011/073270 Jan. 10, 2012.
Claims filed in U.S. Appl. No. 13/513,242 on Jul. 14, 2015 in the response to the Office action of Mar. 26, 2015 for that application.
Claims filed in U.S. Appl. No. 13/877,066 on Sep. 21, 2015 in the response to the Office action of Jun. 24, 2015 for that application.
Notice of allowance issued in U.S. Appl. No. 13/877,066, including examiner's amendment, mailed Nov. 6, 2015.

* cited by examiner

*Primary Examiner* — Irina S Zemel
*Assistant Examiner* — Jeffrey Lenihan
(74) *Attorney, Agent, or Firm* — Pearne & Gordon LLP

(57) ABSTRACT

A glove is formed from elastomer having Mooney viscosity, $ML_{(1+4)}(100°\ C.)$ of 100-220, that contains 25-30 weight % of acrylonitrile, 62-71 weight % of butadiene and 4-8 weight % of unsaturated carboxylic acid, and does not contain sulfur crosslinking agents or vulcanization accelerators. The unsaturated carboxylic acid comprises a first fraction of substituents and a second fraction of substituents, the first fraction of substituents forming cross-links via bonds with each other, and the second fraction of substituents forming cross-links via bonds with a bivalent metal. Glove properties include thickness 0.05-0.15 mm, swelling ratio 240-320, tensile stress 22-35 MPa, elongation to break 480-620%, and tensile stress at 500% elongation 15-35 MPa. By chlorine treatment of both inner and outer surfaces of the glove, the inner surface has decreased tackiness and the outer surface has increased smoothness. Content of metal and metallic salt impurities and an anion contained in the glove is decreased.

6 Claims, 16 Drawing Sheets

Fig.2
Cross-linking reaction of unsaturated carboxylic acids and metallic ions
<This invention>
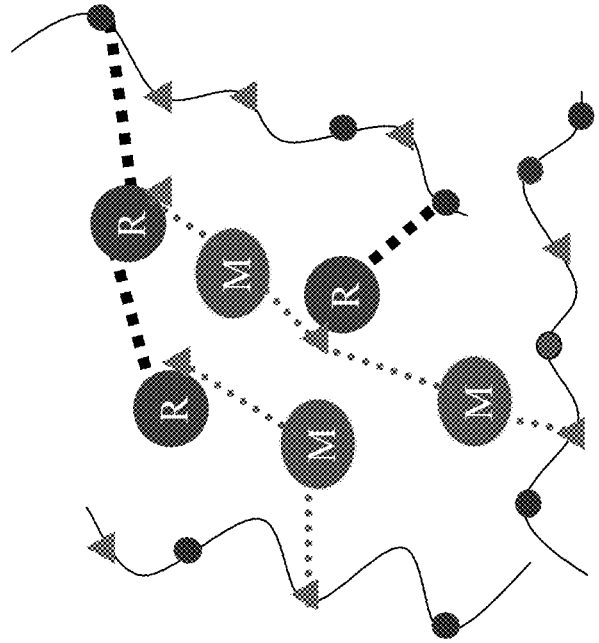
Conventional cross-linking reaction of surfur and metallic ions
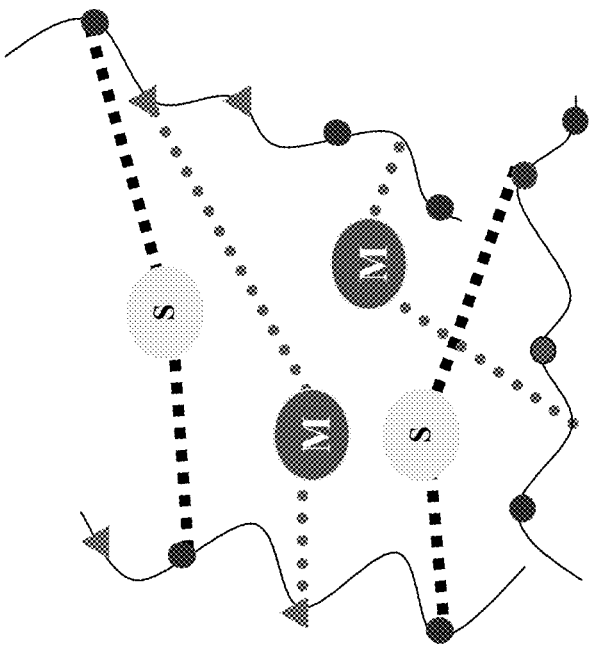

<Electrical feature : Electric resistivity in wearing>

Fig.16
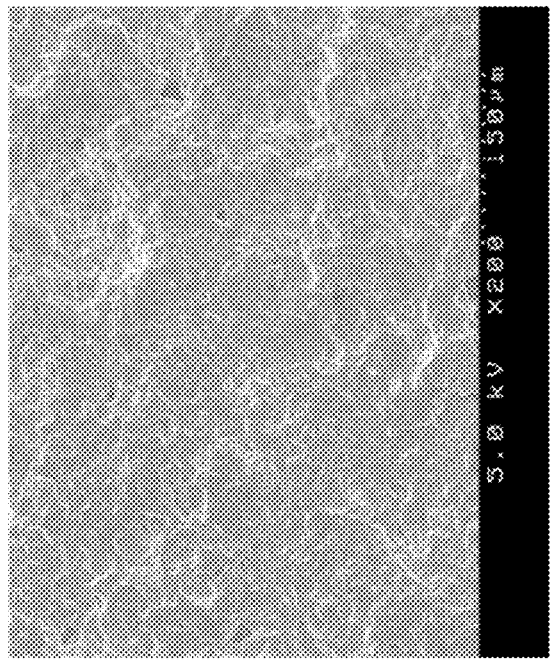
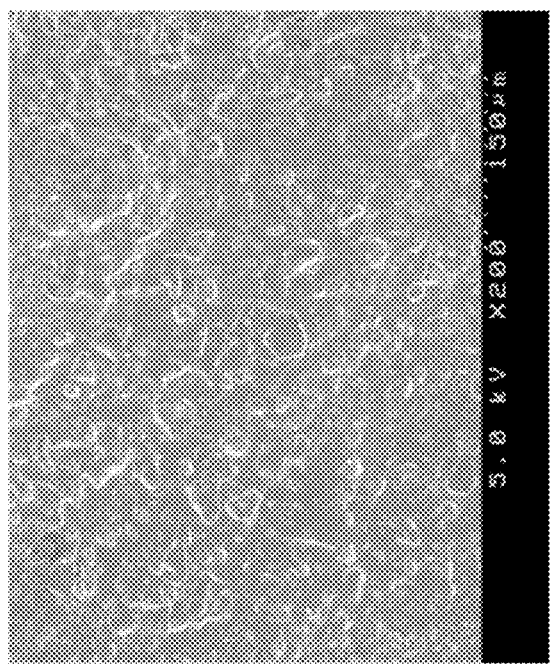

US 9,326,557 B2

VULCANIZATION ACCELERATOR- AND SULFUR-FREE ELASTOMER RUBBER GLOVE FOR CLEAN ROOMS

FIELD OF THE INVENTION

The present invention relates to a rubber gloves of thin film obtained by a method comprising, forming acrylonitrile-butadiene unsaturated carboxylic acid by adding unsaturated carboxylic acid to acrylonitrile-butadiene to which unsaturated carboxylic acid is added or not added, forming a composition by performing first step crosslink and second crosslink, then sticking the composition to surface of a mold or a former and hardening by crosslinking. Since said gloves does not contain sulfur which is a crosslinking agent and sulfur compound which is a vulcanization accelerator, users of the gloves do not cause IV type hypersensitivity and can use it in good hygienic condition. Although said gloves does not contain sulfur which is conventional crosslinking agent and sulfur compound which is conventional vulcanization accelerator, the gloves can be used in condition of good intensity and elongation, further the gloves is characterized that generation of dust is small and do not cause the problem of sub-standard products caused by transportation of metals such as sodium or calcium or chlorine which are contained in gloves to products during at work.

BACKGROUND OF ART

Works of production belonging to fields of electronic instrument or precision processing industry are carried out in a clean room. A rubber gloves which is used by operators working in clean room is prepared by forming materials under the presence of sulfur as a crosslinking agent, or zinc oxide and sulfur compound as a vulcanization accelerator. Sometimes, a vulcanization accelerator which contains sulfur compound can be used. When operator uses a rubber gloves containing sulfur and vulcanization accelerator, sometimes, the operator causes IV type hypersensitivity and becomes to cause casualty of health. Unfortunately, up to the present time, development of gloves by use of rubber which does not use sulfur or sulfur composition which are crosslinking agent and vulcanization accelerator has been considered to be difficult.

By use of said conventional gloves, the users are troubled by casualty of IV type hypersensitivity. Further, in fields of semi-conductor or precision processing, dust or impurities contacts with products and is accumulated, and affects to properties of the products. And this phenomenon is considered as undesirable phenomenon. Regarding a gloves for clean room use, physical properties such as easy elongation and strong resistance against breaking are required. Further, regarding used gloves, recycling is required, and it becomes necessary that the gloves are made of materials which are easier recycling.

U.S. Pat. No. 5,014,362 (Patent Document 1) discloses a crosslinking method of carboxylic nitrile rubber using zinc oxide and sulfur. Typical carboxylic nitrile rubber is formed by segment consisting of acrylonitrile, butadiene and organic acid formed by various mixing ratio. By use of sulfur and a vulcanization accelerator, it becomes possible to form crosslinking by covalent bond in sub segment of butadiene. Further, in a part of carboxylated acrylonitrile (organic acid) ionic bond can be formed by using metal oxide such as zinc oxide or other metal salts. Ionic crosslinking is carried out by zinc ion and use crosslinking by sulfur too. Further, as the method to prepare NBR gloves, U.S. Pat. No. 6,673,871 publication (Patent Document 1), regarding elastomeric product such as gloves, the method to use metal oxide such as zinc oxide as a crosslinking agent by not using crosslinking agent or a vulcanizing agent containing sulfur is disclosed. However, in general, it is considered that only use of zinc oxide is not sufficient.

In the specification of U.S. Pat. No. 7,005,478 publication (Patent Document 2) there is follows disclosure. That is, at the preparation of a product consisting of elastomer, react elastomer possessing a carboxyl group with (a) carboxylic acid or derivatives thereof, (b) compound containing bivalent or trivalent metal and (c) amine or amino compound in (d) condition to contain a neutralizing agent which neutralizes at least a part of carboxylic acid group in said base polymer. At the reaction, a vulcanizing accelerator, thiuram and carbamate are not used. As a base polymer, natural latex rubber, synthetic latex polymer (e.g. acrylonitrile), butadiene rubber such as synthetic butadiene rubber or carboxylic butadiene rubber are mentioned as an example, however MMA is not contained. Or, does not use carboxylated acrylonitrile. In this method, said (c) amine or amino compound is essential component. Amine group or amino group reacts with carboxylic acid derivatives and forms complex with bivalent or trivalent metal. By using complex forming reaction, stabilization becomes difficult and as the result, it is pointed out that a stabilized product is difficult to obtain.

In Non Patent Document 1 (Andrew Kells and Bob Grobes "Cross-linking in carboxylated nitrile rubber dipped film" LATEX 24-25, January 2006 Frankfurt, Germany) reports that a latex, whose tensile strength is improved, is obtained by using tetramethylthiuram (TMTD), 2,2'-dithio-bis(benzothiazole) (MBTS), N-cyclohexylbenzothiazole-sulfinicamide (CBS), zinc diethylthio carbamate (ZDEC) and necessary additives consisting of zinc oxide with small amount of sulfur. This report shows that carboxylic nitrile latex gloves having excellent durability cannot be obtained without use sulfur or a vulcanizing accelerator based on sulfur.

A method to prepare a gloves from self crosslinking material is investigated, while, action of self crosslinking method which is necessary for preparation of desired gloves is not technically explained in the report. It is understood that sufficient results are not obtained regarding technical explanation of self crosslinking latex.

In Non Patent Document 2 (Dr. SorenBuzs "Tailored synthetic dipping lattices: New approach for thin soft and strong gloves and for accelerator-free dipping" LATEX 23-24, January 2008, Madrid, Spain) following two crosslinking methods are disclosed. That is, direct crosslinking method of NBR latex by functional reactive group (R) instead of conventional sulfur crosslinking, and crosslinking method of NBR latex by ionic bond formed between carboxyl group of NBR latex by zinc oxide. And, the document reports that this method is promising as a future technique. Unfortunately, there is no specific explanation about functional group which acts in covalent bond. And is not succeeded to make clear the concrete method for forming.

In Nichias technical information (Vol 5, 2000, No. 321), combination of epoxidated natural rubber and carboxylic NBR is used for self crosslinking.

Regarding said point, the applicant of this application has also filed another application on same day of this application.

PRIOR TECHNICAL DOCUMENT

The inventors of the present invention have accomplished following invention as relating an elastomer rubber which does use a vulcanization agent and sulfur and an elastomer rubber product ("Elastomer rubber which does not use sulfur and vulcanization accelerator and elastomer rubber product" application).

That is, the inventors of the present invention have accomplished inventions of "An elastomer composition comprising, an emulsion which comprises 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent which is possessed by said unsaturated carboxylic acid is left in state of free, further Mooney viscosity ($ML_{(1+4)}(100°$ C.)) of the crosslinked product is 100-220 and film weight swelling ratio of the crosslinked product is 200-400%".

"An elastomer composition comprising, 25-30 weight % of acrylonitrile, 62-71% of butadiene and 4-8 weight % of unsaturated carboxylic acid (total 100 weight %), wherein a covalent bond is formed by a bond trough at least one part of substituent which is possessed by said unsaturated carboxylic acid, further, residual substituent of at least one part of substituent which is possessed by said unsaturated carboxylic acid is crosslinked by forming ionic bond through bivalent metallic ion, further film weight swelling ratio of the crosslinked product is 200-400%" is accomplished, and using this invention, following invention of "A gloves formed from elastomer comprising 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent possessed by said unsaturated carboxylic acid is crosslinked by bivalent metal, said elastomer does not contain sulfur which is a crosslinking agent and sulfur composition which is a vulcanization accelerator, Mooney viscosity ($ML_{(1+4)}(100°$ C.)) of said elastomer crosslinked by a bond of at least one part of substituent possessing said unsaturated carboxyl group is 100-220, and thin film gloves prepared from said elastomer does not contain sulfur which is a crosslinking agent and sulfur composition which is a vulcanization accelerator, and thickness of the gloves is 0.05-0.15 mm, glove swelling ratio at formation of the gloves is 240-320, tensile stress of the gloves is 22-35 MPa, elongation to break of the gloves is 480-620% and tensile stress at 500% elongation of the gloves is 15-35 MPa" is accomplished.

Since even if a small amount, sulfur and sulfur compound which are crosslinking measure is not contained in the glove, crosslinking method which does not cause problem of IV type hypersensitivity is accomplished. Specifically, "thickness is 0.05-0.15 mm, swelling ratio at glove preparation is from 240 to 320, tensile stress is 22-35 MPa, breaking elongation is 32-35%, elongation at breaking is 480-620% and tensile stress at 500% elongation is 15-35 MPa".

Consequently, a gloves which has sufficient properties necessary for general works is accomplished. Although said new gloves is developed, further improvement of gloves to be used in clean room, that is, new gloves which protects transportation of metallic ion contained in gloves to precision parts or precision instrument is required.

Accordingly, an improved gloves characterized that, even if an operator is wearing gloves, the operator can progress his works without abnormal feeling, that is, by same feeling as empty handing is strongly required. Further, in actual works, if a glove has tackiness at wearing of the glove, hand of an operator becomes very difficult to insert into the glove. And after wearing, when fingers or hand are bended then stretched, the glove is adhered to hand tightly and becomes difficult to take off. The newly improved glove is required to have a property to avoid such a problem.

When an operator enters in a clean room, operators must be in a condition not to bring dust or dirt in the clean room. At the works in clean room, the operators are controlled seriously not to stick sweat or fats generated from the body to products. An operator is required to pay careful attention not to contaminate products by adhering with dust or dirt brought into the clean room.

Gloves for clean room use which is used by operators in clean room have a possibility to contact with products directly. If small amount of impurity is contained in a glove, the impurity transfers to the products through the glove, and the transferred impurity exerts bad influence upon products. In a case when an operator contacts with products through glove, it is necessary to take countermeasure not to make transfer impurity metals or anions (Na, K, Ca, Al, Mg, Fe, P, Cl$^-$, $SO_4^{2-}$, Zn, Pb, Cr, Cd etc), which are recognized as a problem at the production process of semi-conductor, to products. For said purpose, the countermeasure to reduce the amount of said impurity metals or anions contained in gloves, and not to transfer said impurity metals or anions to products is necessary. In actual, it is necessary to measure eluted amount of these metals into water and measure the condition of transferring of the metals. To the newly developed glove, it is required that the eluted amount of those metals are respectively small, further, after washed, it is required that contaminated particles are small and not to generate dust.

From the general view of details of development of gloves for clean room use, problem that the gloves for clean room use made clear.

For the purpose to obstruct transferring of dust or metal, methods of (1) to provide a membrane to a glove which obstructs transferring of dust or metal and (2) to wash a glove are generally known. Under the circumstance that kinds of dust and metals to be controlled are changing, further the numbers of items of these metals increasing, new method becomes necessary.

(1) The methods to provide a membrane to obstruct transferring dust or metal are mentioned as follows.
Selection of starting materials and methods for obstruct generation of dust are mentioned in following prior arts.
A method to form a gloves using non-pore moisture permeable urethane foam (Patent document 3: JPH5-195303A publication), a method to form a gloves using elongated porous polytetrafluoroethylene resin film (Patent Document 4, JPH7-216610A publication) or a method to obtain gloves by heat sealing film layer which is non dust condition by protecting film layer and to remove the protecting film (Patent document 5: JPH9-137310A publication) can be mentioned. These prior arts disclose a method to use high grade materials and production process is troublesome, and in some cases, according to presence of pores, permits passing of metallic ion such as sodium ion. Therefore, these gloves cannot oppose to a gloves prepared by using rubber materials which has good properties. It is public known that vinyl chloride resin can satisfy the condition to obstruct transference of heavy metal as a gloves used for works in clean room (Patent document 6: JPH11-12823A publication, Patent document 7: JPH6-79737A publication). However, in a case when vinyl chloride resin is used, there is a problem to generate chlorine at recycling, and from this point of view, active use of vinyl chloride resin is difficult.

(2) There is an invention to use a measure such as washing of gloves. However, in the state that new impurity metal or metallic ion are added or numbers of these new impurity metals or metallic ions are increased, washing by water alone is not sufficient, and new method together with the washing method becomes necessary. This method is to reduce the amount of metals contained in gloves as small as possible, and to reduce the amount of metals released from the gloves. Said methods are mentioned as follows. Document (Patent Document 8: JPH11-302911A publication) relating to reduce the transferring amount of sodium to subjects contacted with gloves to less than 200 ppb can be mentioned. Specifically, rubber latex characterized that contents of sodium is small is prepared by public known polymerization method using above mentioned starting materials. An autoclave or stirring propeller used for polymerization is washed previously by ion-exchange water. As a rubber latex whose sodium contents is small, rubber latex consisting of materials not containing sodium in chemical structure is used after filtrated by ultra-filtration. After-treatment to remove ions is generally performed by dipping in warm water of about 40° C. for 72 hours around. A gloves is dipped into pure water and washed by ultrasonic cleaning. Further, an invention (Patent Document 9: JPH10-25607A publication) discloses a method to remove ions from rubber gloves by very shorter time compared with a method by only dipping. As a total system, said method is too complicated and industrialization is difficult.

In production of precision electronic parts or semi-conductor parts, since particles stuck on the surface of rubber gloves or metallic ions contained in the rubber gloves affect badly to half-finished products or finished products, a rubber gloves previously washed by pure water or ultra pure water is used. "Dip molded gloves whose surface resistivity is small compared with conventional products which is washed by ultra pure water" prepared by using latex composition characterized that rubber is dispersed stable without forming coagulation by blending previously specific amphoteric surfactant to acrylonitrile-butadiene prepared by copolymerization of monomer possessing carboxylic group is used (Patent Document 10: JP2004-300386A publication).

Washing with water is an effective measure to remove metallic ions contained in a rubber gloves. However, according to a kind of starting materials, there is a case that the amount of contained metallic ions is large, and in such a case, it is difficult to eliminate transference of metallic ions only by washing with water.

Gloves for clean room use are required to have excellent physical properties such as elongation and breaking strength. By having such an excellent physical properties, sufficient elongation becomes possible in works by hand, and works intended by an operator can be made perfectly. In such works, sometimes glove is adhered to hand tightly and becomes difficult to take off. As a method for easy wearing and taking off of gloves, following methods can be mentioned. (1) to spread powder, for example, talk on inner surface of gloves, (2) to form a layer in inner surface of glove so as to obstruct of tight adherence of gloves inner surface. (3) to provide uneven surface in inner surface of gloves by chlorine treatment. (4) to use soft material.

(1) A method to spread powder e.g. talk on inner surface of gloves is explained as follows.

In a case of gloves obtained by spreading powder, said powder falls down at wearing of taking off from the gloves. When the gloves is used as a medical use (for operation), since fallen down powder sometimes causes trouble, this method is not suitable.

(2) As a method to form a layer in inner surface of glove so as to obstruct of tight adherence of gloves inner surface, following method can be mentioned.

"A rubber gloves comprising, inner coating layer formed by coating agent containing resin particles and latex, wherein particles observed in unit area of said inner surface coating layer is characterized that maximum particle size is 2-20 μm and ratio of total projection area to unit area (project area ratio) is 5-50%" (Patent Document 11: JP2002-88541A publication).

"Powder free medical gloves comprising, first surface including a layer of dispersed particles such as salts in previously formed liquid layer, said layer is gelled or hardened by powder free coagulant, and second surface characterized that modified vinyl acetate polymer by silicone which makes wearing easy" (Patent Document 12: JP2007-525336A publication).

"A gloves comprising, textured surface prepared by dissolving discrete particles so as to remain textured processed or textured processed foam or textured foam coating" (Patent Document 13: JP2007-524772A publication).

"A gloves comprising, elastic products containing supporting main body and a coating existing on inner surface of the supporting main body, said supporting main body contains a layer made of elastic subject, forming inner surface and outer surface, said coating forms a surface by which said products contacts with a user, and crosslinked hydrogel net work structure in which active agent being possible to provide advantage to the user is existing in said coating, and said active agents can be released from said net work structure when the coating is contacted with aqueous environment" (Patent Document 14: JP2007-515565A publication).

The specification of U.S. Pat. No. 6,709,725 (Patent Document 15) discloses "In general, for the purpose to provide a gloves of not tackiness and having good slipping property, the surface of the gloves is coated by thin layer of synthesized polymer having low frictional coefficient less than 7 micro meter. A latex barrier layer is laminated to form a state not containing sodium dodecyl sulfate which is ordinary surfactant, skin stimulus such as calcium nitrate which is ordinary coagulant, allergen such as vulcanization accelerator or latex protein or other rubber treatment chemicals which causes skin stimulus or allergic reaction, further reciting not containing sodium or calcium. Elastomer layer is laminated to obstruct leaking of these compounds."

(3) Performs easy slipping surface on the inner surface of glove by chlorine treatment and further providing slightly uneven surface. Chlorine treatment can be carried out on formed gloves. In general, chlorine treatment contains a step to make a formed product with chlorine containing solution or chlorine containing gas. During this step, outer surface of the formed products reacts with chlorine. Concretely, chlorine treatment is carried out to reduce adherence of gloves (Patent Document 16: JP2004-526063A publication).

As a method to specify a part to carry out chlorine treatment following invention can be mentioned.

Disclosed gloves displays excellent properties in gripping ability and wearing and taking off efficiency. In a case of working gloves made of NBR which can be properly used for clean room use or medical use, a process to provide slipping ability is performed to inside surface by chlorine treatment. Accordingly, outer surface side of glove main body (the side by which an user grips a subject in a state that the user is wearing the gloves) displays above mentioned gripping property and inner surface side of glove main body (the side to stick hand or wrist of the user) displays desired slipping ability (Patent Document 17: JP2004-131885A publication). JP2010-520927A publication (Patent Document 18) states that although chlorination removes powder from elastomer products and modify inner surface so as to improve wearing efficiency, gripping power of outer surface is deteriorated.

(4) Measure to eliminate sticky feeling (tackiness) of materials which forms rubber gloves and to provide softness.

When compared with gloves made of natural rubber or poly vinyl chloride, although gloves made of NBR is excellent in oil resistance and abrasion resistance, further has good property of low dust and law generation of static electricity, the gloves is inferior in repulsive elasticity and softness and has defect of easy slipping when the gloves grips a substance. Said defects are pointed out as a problem from view point of safety of works. When alkylacrylate-acryonitrile-acrylic acid or methacrylic acid co-polymerized latex is blended to NBR latex, the film becomes to have good elasticity and not slips at water leaking And, when at least one selected from a group consisting of rosin resin latex and terpene resin latex is added by 1-10 weight parts to NBR latex solid, deterioration of intensity is lightened and can maintain tensile strength of over than 200 kg/cm² which is a standard of active use (Patent Document 19: JP2000-290816A publication).

NBR latex material of composition prepared by blending at least 1-2 weight % of sulfur and 0.5-1 weight % of vulcanizing accelerator are blended to 94-96 weight % of NBR latex is used for preparation of glove main body, and glove of very thin thickness of 0.05-0.15 mm is formed. Hand coating part 1 is formed so as to cover the hand of user tightly, wrist coating part 2 is formed so as to same size to the wrist or to become slightly wider toward skirt part and inner surface of glove main body is treated of slipping (Patent Document 20: JP2004-131885A publication). This invention has a problem that the production process becomes complicated. And in the invention there is a recitation reciting that inner surface of glove main body is desirable to be treated by chlorine.

As a starting materials of above mentioned gloves, a materials which does not cause IV type hypersensitivity which appears delay by contacting with skin and not having problem for health is required. Further, easy recycling feature is also required. The property of materials of the gloves is to provide a gloves having following future. That is, at the works in clean room, the gloves is good in physical property such as elongation and breaking strength so as the works that the user is intending to be carried out sufficiently. The gloves is required to have sufficient elongation against to voluntary moving of hand to perform intending works of the user. In said works the glove which does not have problem of difficult wearing, tackiness and being hard to take off the gloves easily because hand and glove are tightly adhered is required. And quality of gloves for clean room use effects directly to products. It is necessary that impurity metals or anions (Na, K, Ca, Al, Mg, Fe, P, Cl⁻, $SO_4^{2-}$, Zn, Pb, Cr, Cd etc), which are recognized as a problem at the production of semi-conductor, does not transfer to subjects which is contacted by the gloves, further, when inner surface of the gloves is treated by inner surface treating agent, generation of dust is small. The gloves is required that the eluting amount of metal is small, numbers of polluted particles of washed gloves is small and generation of dust is small.

PRIOR TECHNICAL DOCUMENT

Patent Document

[Patent Document 1] U.S. Pat. No. 6,673,871 publication, JP2004-526063A publication.
[Patent Document 2] U.S. Pat. No. 7,005,478 publication
[Patent Document 3] JPH5-195303A publication
[Patent Document 4] JPH7-216610A publication
[Patent Document 5] JPH9-137310A publication
[Patent Document 6] JPH11-12823A publication
[Patent Document 7] JPH6-79737A publication
[Patent Document 8] JPH11-302911A publication
[Patent Document 9] JPH10-25607A publication
[Patent Document 10] JP2004-300386A publication
[Patent Document 11] JP2002-88541A publication
[Patent Document 12] JP2007-525336A publication
[Patent Document 13] JP2007-524772A publication
[Patent Document 14] JP2007-515565A publication
[Patent Document 15] U.S. Pat. No. 6,709,725 publication
[Patent Document 16] JP2004-526063A publication
[Patent Document 17] JP2004-131885A publication
[Patent Document 18] JP2010-520927A publication
[Patent Document 19] JP2000-290816A publication
[Patent Document 20] P2004-131885A publication Non Patent Document

[Non Patent Document 1] Andrew Kells and Bob Grobes "Cross-linking in carboxylated nitrile rubber dipped film" LATEX 24-25, January 2006 Frankfurt, Germany
[Non Patent Document 2] Dr. SorenBuzs "Tailored synthetic dipping lattices: New approach for thin soft and strong gloves and for accelerator-free dipping" LATEX 23-24, January 2008, Madrid, Spain
[Non Patent Document 3] Nichias technical information (Vol 5, 2000, No. 321)

BRIEF SUMMARY OF THE INVENTION

Object of the Invention

The first object of the present invention is to provide a new elastomer gloves formed by materials which does not manifest symptom of IV type hypersensitivity appears delay by contact with skin, and said materials can be easily recycled. Concretely, the first object of the present invention is to provide a gloves prepared by crosslinking an elastomer having new structure using a new crosslinking agent instead of conventional crosslinking agent, that is, sulfur, combination of sulfur and metal oxide such as zinc oxide, and sulfur containing compound which is a vulcanization accelerator.

The second object of the present invention is to provide a gloves having physical property of easy elongation and strong resistance against breaking, and an operator wearing the gloves can progress his works without abnormal feeling, that is, by same feeling as empty handing.

The third object of the present invention is to obtain a glove having property of easy inserting a hand of an operator into the glove at wearing of the glove, and after wearing, when fingers or hand are bended then stretched, the glove is not adhered to hand tightly. Further, since new crosslinking agent is used, impurity metals and anions contained in elastomer are changed and the amount of these compounds is predicted to be increased. That is, the third object of the present invention is to provide a gloves to be used in clean room which eliminate said impurity metals and anions to the level that said impurity metals and anions do not transfer to products.

BRIEF ILLUSTRATION OF THE INVENTION

The inventors of the present invention investigated above mentioned objects and found out following solving mean and already accomplished an invention regarding rubber gloves which dissolves said objects.

(1) "An elastomer composition comprising, an emulsion which comprises 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent which is possessed by said unsaturated carboxylic acid is left in state of free, further Mooney viscosity ($ML_{(1+4)}(100°$ C.)) of the crosslinked product is 100-220 and film weight swelling ratio of the crosslinked product is 200-400%."

"An elastomer composition comprising, 25-30 weight % of acrylonitrile, 62-71% of butadiene and 4-8 weight % of unsaturated carboxylic acid (total 100 weight %), wherein a covalent bond is formed by a bond trough at least one part of substituent which is possessed by said unsaturated carboxylic acid, further, residual substituent of at least one part of substituent which is possessed by said unsaturated carboxylic acid is crosslinked by forming ionic bond through bivalent metallic ion, further film weight swelling ratio of the crosslinked product is 200-400%" is accomplished, and using this invention, following invention of "A gloves formed from elastomer comprising 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent possessed by said unsaturated carboxylic acid is crosslinked by bivalent metal, said elastomer does not contain sulfur which is a crosslinking agent and sulfur composition which is a vulcanization accelerator, Mooney viscosity ($ML_{(1+4)}(100°$ C.)) of said elastomer crosslinked by a bond of at least one part of substituent possessing said unsaturated carboxyl group is 100-220, and thin film gloves prepared from said elastomer does not contain sulfur which is a crosslinking agent and sulfur composition which is a vulcanization accelerator, and thickness of the gloves is 0.05-0.15 mm, glove swelling ratio at formation of the gloves is 240-320, tensile stress of the gloves is 22-35 MPa, elongation to break of the gloves is 480-620% and tensile stress at 500% elongation of the gloves is 15-35 MPa" is accomplished, and dissolved the first object of the present invention.

(2) After obtain a gloves which dissolved the first object of the present invention using new crosslinking agent, new measures are established to a part of process and found out that the second object of the present invention can be dissolved.
The new established processes are mentioned below.
(c) process: process to dry the mold or former to which coagulant is stuck at 50-70° C., and to dry whole or partial surface.
(h) process: in a state that the composition to prepare elastomer is stuck on the surface of the mold or former, and heat treated at 120-150° C. for 20-30 minutes so as to harden by crosslinking.

(3) After obtaining a gloves which dissolved the third object of the present invention, new measures are established to a part of process and found out that the second object of the present invention can be dissolved
The new established processes are mentioned below.
(j) process to treat the surface of elastomer film, which is post leached by (i) process and dried, by chlorine so as to remove sticky feeling (tackiness), then neutralize and wash with water.
(k) process to wash and dry the film of elastomer, the surface of which is treated by chlorine, on the mold or former.
(l) process to detach chlorine treated elastomer film from the mold or former and to turn it over.
(m) process to treat turned over glove by chlorine (off line chlorine treatment).
(n) process to wash the glove whose outer surface is treated by chlorine in said (m) process with pure water and to dry it.

(4) Whole process for preparation of gloves can be illustrated as follows. That is, series of process to prepare a gloves composed of thin film of elastomer after forming thin film elastomer using a mold or a former.
(a) process to wash a mold or a former by cleaning solution and remove contamination, then to wash it by cool water and to dry it.
Dried mold or former is treated by direct dipping method or coagulate dipping method. Selection of these methods is depending on a kind of product. Direct dipping method is to dip dried mold or former into a mixture prepared by a recipe of the present invention.
(b) process to dip the mold or former into solution of coagulant containing 8-17 weight % of $Ca^{2+}$ ion.
The coagulant is prepared as aqueous solution which contains 10 weight % of $Ca^{2+}$. The mold or the former is dipped in said solution. Consequently, coagulant is stuck on the surface of the mold or the former. Time for dipping is 10-20 seconds. A wetting agent or an anti adherence agent can be added. Concretely, zinc stearate and calcium stearate can be used.
(c) process to dry the mold or the former to which coagulant is stuck at 50-70° C. and to dry whole or partial surface of the gloves.
The mold or the former to which coagulant is stuck is stuck by 50-70° C. and to dry whole or partial surface of the mold or the former.
(d) process to dip the mold or the former obtained in (c) process to which coagulant is stuck and dried into elastomer composition of the present invention for 1-20 seconds under temperature condition of 25-35° C.
By dipping the mold or the former to which coagulant is stuck into composition used for preparation of elastomer for 15 seconds under temperature condition of 25-30° C., and the elastomer is stuck. Dipping process can be repeated several times. Ordinary, this process is repeated 2 times or more.
(e) process to wash the mold or former by water and remove agents (leaching process).
A former which is coated partially by dried latex is leached in a leaching tank containing hot water (30-70° C.) for 90-140 seconds.
(f) Beading (sleeve winding process)
After leaching process, beading (sleeve winding process) is carried out.
(g) drying process in a furnace
A glove former is dried at 80-120° C. for 250-300 seconds.
(h) process to crosslink and harden the composition for producing elastomer stuck on the surface of mold or former at 120-150° C. for 20-30 minutes.
(i) after post leaching (contained agents are removed by washing with water) the surface of elastomer film containing bivalent metal stuck on the surface of the mold or the former obtained in (h) process, process to dry the elastomer film.
Post leaching is performed at 30-80° C. for 60-80 seconds.
(j) after post leaching of said (i) process and drying process, the surface of elastomer film is treated by chlorine so as to remove sticky feeling (tackiness), further treated by neutralization.
Chlorine treatment is carried out by dipping crosslinked elastomer film in dried state on the mold or the former into aqueous solution of chlorine concentration of 50-200 ppm in treating vessel. As the result, surface of elastomer film having a shape of glove is reacted and thickness of the surface is slightly reduced.

(k) elastomer film whose surface is treated by chlorine on the mold or the former obtained in said (j) process is washed with water, then dried. In this process, sticky feeling (tackiness) of the surface is removed.

(l) process to take off chlorine treated elastomer film on the mold or former and to turn over it.

Chlorine treated elastomer film on the mold or the former is took off from the mold or the former and turn over so as the treated surface to be reverse surface. Until this process is online process. Portion which contact with hand in glove is made slippery, and a glove which promises a state of easy slipping of hand in glove can be obtained.

(m) turned over glove is inserted into chlorine treating vessel, the glove is dipped into chlorine water and perform chlorine treatment (offline chlorine treatment process).

The glove is inserted into chlorine treatment vessel, aqueous solution of chlorine is poured so as to dip the glove, then performs off line chlorine treatment. Condition of chlorine treatment is mentioned below.

The glove is inserted into chlorine treatment vessel, aqueous solution of chlorine is poured so as to dip the glove, then performs off line chlorine treatment. The chlorine treatment vessel provides a cylindrical basket turning sideway, and by rotating the basket containing the glove chlorine treatment is performed. Chlorine treatment condition is mentioned as follows.

- Previous washing: 7-13 minutes
- Chlorine concentration: 50-70 ppm
- Temperature of chlorine water: 25-30° C.
- Chlorine treatment time: 7-13 minutes
- Neutralizing time: 5-10 minutes
- Rinsing 1: 10 minutes
- Rinsing 2: 10 minutes
- Rinsing 3: 10 minutes
- Drying temperature: 70° C.±15° C.
- Previous dry: 13-18 minutes at room temperature
- Drying time: 160-200 minutes (tumbler dryer is used)
- cooling time: 20-40 minutes (n) washing by pure water is carried out continuing to process to wash the glove whose outer surface is chlorinated by pure water and dry it.

- Quantity: 5000 pieces of glove (30 kg)
- Amount of water: 500-600 L (first and second)
- Condition of pure water: ion exchanged water which has resistivity of more than 18 MΩ·cm
- Temperature of water: 20-30° C.
- Washing time: 10-20 minutes ($1^{st}$ time and $2^{nd}$ time)
- Washing procedure: after washing (first time), there are processes of water discharge, washing, washing, dewater by centrifuge and drying [there is no dewatering process between first and second washing process]
- Drying temperature: 65° C.±15° C.
- Drying time: 1 hour Processes from (a) to (l) can be carried out by online treatment. Continued processes from (m) to (o) can be treated by off line.

Effect of the Invention

According to the present invention, since sulfur which is crosslinking agent and sulfur compound which is vulcanizing accelerator are not used, manifest symptom of IV type hypersensitivity can be oppressed and desirable from view point of health. The gloves has property of easy elongation and hard to be broken, and since is not placed under restraint at actual works, the gloves is liable to use. In a case when a hand is inserted into the glove, the hand can slip easily and can be inserted easily, and permits easy works. When fingers or hand are bended then stretched, the glove is not adhered to hand tightly. Although kinds of impurity metals and anions contained in elastomer changes and the amount of these compounds is predicted to be increased, the present invention can provide a gloves to be used in clean room which eliminate said impurity metals and anions to the level that said impurity metals and anions do not transfer to products, accordingly excellent precision machine can be produced using the gloves of the present invention.

BRIEF ILLUSTRATION OF DRAWINGS

FIG. 1 is a drawing showing the state to crosslink the materials composition of the present invention FIG. 2 is a drawing illustrating crosslinking state of the present invention and conventional crosslinking state FIG. 3 is a drawing to show the amount of volatile unreacted MMA monomer contained in the present invention and conventional product. Lower drawing of FIG. 3 (present invention) shows the amount of volatile unreacted MMA monomer of 746SXL. Upper drawing of FIG. 3 (conventional case) shows the amount of volatile unreacted MMA monomer.

FIG. 4 Upper drawing of FIG. 4 shows measurement result of latex particle size of 746SXL of the present invention. Lower drawing of FIG. 4 shows measurement result of latex particle size of conventional 6322.

FIG. 13 shows a measuring apparatus of resistance when gloves is put on.

Figure 15:
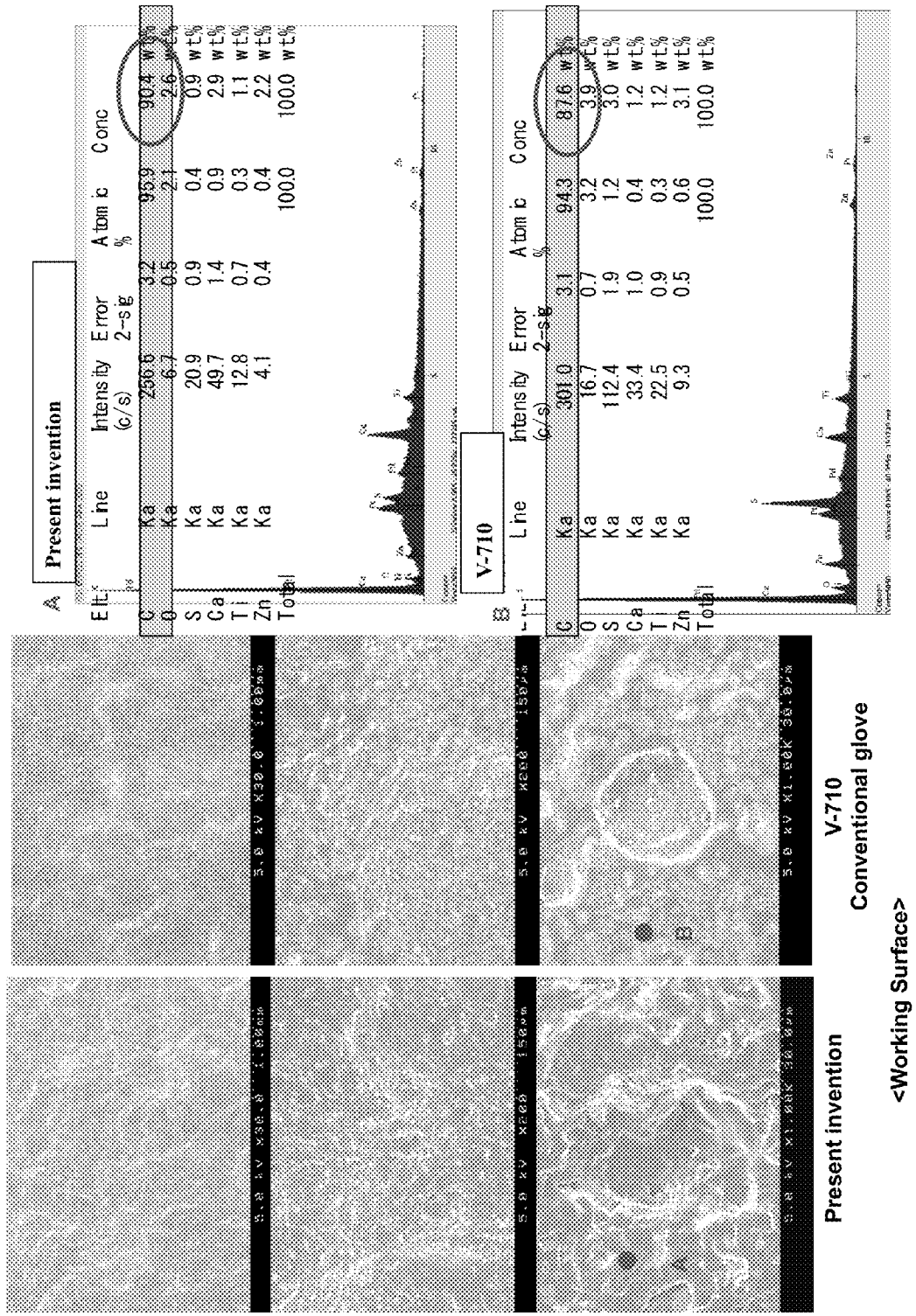

FIG. 15 A shows outer surface of the third finger of the present invention and existing of elements in outer surface of the third finger of the present invention. B is a drawing indicating outer surface of the third finger of the conventional glove and existing of elements in outer surface of the third finger of the conventional glove.

FIG. 16 shows electron microscopic picture of the present invention and conventional sulfur/zinc crosslinked glove.

PREFERRED EMBODIMENT OF THE INVENTION

The present invention relates to acrylonitrile-butadien-unsaturated carboxylic acid formed by adding unsaturated carboxylic acid to acrylonitrile-butadien or acrylonitrile-butadien-unsaturated carboxylic acid, (1) elastomer composition of emulsion of acrylonitrile-butadien-unsaturated carboxylic acid to which first step crosslinking is performed, (2) after the first step crosslinking is performed, obtain elastomer composition of emulsion of acrylonitrile-butadien-unsaturated carboxylic acid to which second step crosslinking is performed. (3) By using elastomer composition of emulsion of acrylonitrile-butadien-unsaturated carboxylic acid to which second step crosslinking is performed which is obtained in said (2), a gloves having new property is obtained. Products obtained in said (1)-(3) have specific property.

(1) The property of the elastomer composition of acrylonitrile-butadien-unsaturated carboxylic acid to which first step crosslinking is performed is mentioned below.

An emulsion consisting of acrylonitrile-butadiene unsaturated carboxylic acid elastomer obtained by adding unsaturated carboxylic acid to acrylonitrile-butadiene or acrylonitrile-butadiene unsaturated carboxylic acid to which the first step crosslink is performed by bonding an end group of unsaturated carboxylic acid added to acrylonitrile-butadiene unsaturated carboxylic acid obtained by adding unsaturated carboxylic acid to acrylonitrile-butadiene or acrylonitrile-butadiene unsaturated carboxylic acid with an end group of unsaturated carboxylic acid added to other acrylonitrile-butadiene unsaturated carboxylic acid obtained by adding carboxylic acid to acrylonitrile-butadiene or acrylonitrile-butadiene unsaturated carboxylic acid.

The acrylonitrile-butadien-unsaturated carboxylic acid, which is the product consisting of 25-30 weight % of acrylonitrile, 62-71 weight % of butadiene and 4-8 weight % of unsaturated carboxylic acid (total 100 weight %), and specified by weight ratio of each component. The part in which crosslinking is formed is 62-71 weight % of butadiene and occupy a largest position. The unsaturated carboxylic acid which is used for is ranked to smallest position among three components.

The property of emulsion comprising acrylonitrile-butadien-unsaturated carboxylic acid elastomer obtained by adding unsaturated carboxylic acid to acrylonitrile-butadien or acrylonitrile-butadien-unsaturated carboxylic acid, to which the first step crosslink is performed is mentioned below.

An elastomer composition comprising, an emulsion which comprises 25-30 weight % of acrylonitrile, 62-71 weight % of butadiene and 4-8 weight % of unsaturated carboxylic acid (total 100 weight %), wherein crosslink is formed by a bond through at least a part of substituent which is possessed by said unsaturated carboxylic acid, and residual substituent of at least one part of substituent which is possessed by said unsaturated carboxylic acid is left in state of free, further Mooney viscosity ($ML_{(1+4)}(100°$ C.$)$) of the crosslinked product is 100-220 and film weight swelling ratio of the crosslinked product is 200-400%.

Starting materials composition containing 25-30 weight % of acrylonitrile, 62-71 weight % of butadiene and 4-8 weight % of unsaturated carboxylic acid (total 100 weight %) can be obtained by mixing starting materials under the presence of a dispersing agent.

A mixture adding unsaturated methacrylic acid to acrylonitrile-butadien can be obtained by purchasing following mixture.

Carbolylated acrylonitrile polybutadiene latex (SXL-XNPR and 746SXL of Sintomer Co., Ltd.) can be used. Further, selectively used by selecting at least one from a group consisting of Pure Product of Polymer Latex and Polyac 560 of Shin Foong Co., Ltd.

It is considered that although an end group is formed in unsaturated carboxylic acid prepared by adding unsaturated methacrylic acid to acrylonitrile-butadien, in unsaturated carboxylic acid prepared by adding unsaturated methacrylic acid to other acrylonitrile-butadien bond is not formed between end groups.

As an end group of unsaturated carboxylic acid used for crosslink, any kind of end group which can form a bond with an end group of other unsaturated carboxylic acid can be voluntarily used. An end group of unsaturated carboxylic acid used for a bond is, for example, carboxylic group, methylol amide group, reaction product of carboxylic group and amine or reaction product of carboxylic group and alkyl alcohol. These end groups can be introduced directly into unsaturated carboxylic acid or can be introduced voluntarily by means of substitution. Crosslinking is carried out by heating at 40° C. and under presence of water and surfactant.

Forming reaction of crosslink is illustrated as follows.

Prepare an acrylonitrile-butadiene unsaturated carboxylic acid elastomer obtained by adding unsaturated carboxylic acid to acrylonitrile-butadiene or acrylonitrile-butadiene unsaturated carboxylic acid to which the first step crosslink is performed by bonding an end group of unsaturated carboxylic acid added to acrylonitrile-butadiene unsaturated carboxylic acid obtained by adding unsaturated carboxylic acid to acrylonitrile-butadiene or acrylonitrile-butadiene unsaturated carboxylic acid with an end group of unsaturated carboxylic acid added to other acrylonitrile-butadiene unsaturated carboxylic acid obtained by adding carboxylic acid to acrylonitrile-butadiene or acrylonitrile-butadiene unsaturated carboxylic acid. This method is synonymous with the reaction method mentioned below.

An elastomer, which is characterized that acrylonitrile-butadiene or acrylonitrile-butadiene unsaturated carboxylic acid (or methacrylic acid) is added to unsaturated carboxylic acid (or methacrylic acid) to which unsaturated carboxylic acid (or methacrylic acid) polymer is added at the middle of acrylonitrile-butadiene part or at the middle of acrylonitrile-butadiene of acrylonitrile-butadiene unsaturated carboxylic acid part, prepared by adding unsaturated carboxylic acid (or methacrylic acid) to acrylonitrile butadiene, after forming an elastomer of acrylonitrile-butadiene to which unsaturated carboxylic acid (or methacrylic acid) is previously added or not added.

As an embodiment of above mentioned method, acrylonitrile and butadiene is polymerized in emulsion state emulsion, and acrylonitrilebutadiene polymer is prepared. By adding unsaturated carboxylic acid (or methacrylic acid) in the first, copolymer of unsaturated carboxylic acid (or methacrylic acid) and acrylonitrilebutadiene is obtained (case 1). In other case which does not add unsaturated carboxylic acid (or methacrylic acid) in the first, acrylonitrile and butadiene polymer is used (case 2).

Above mentioned is an meaning of "acrylonitrilebutadiene to which unsaturated carboxylic acid is previously added or not added". In Case 1, amount of unsaturated carboxylic acid to be added is minute.

To a polymer of unsaturated carboxylic acid, methacrylic acid and acrylonitrilebutadiene obtained by adding unsaturated carboxylic acid (or methacrylic acid) in the first, unsaturated carboxylic acid (or methacrylic acid) is further added, and obtain a polymer of unsaturated carboxylic acid (or methacrylic acid) and acrylonitrile-butadiene in which unsaturated carboxylic acid (or methacrylic acid) is existing in butadiene part of said same or different polymer (case 3). By adding unsaturated carboxylic acid (or methacrylic acid) to a polymer of acrylonitrile and butadiene to which unsaturated carboxylic acid (or methacrylic acid) is not added in the first, and obtain a polymer of unsaturated carboxylic acid (or methacrylic acid) and acrylonitrile-butadiene in which unsaturated carboxylic acid (or methacrylic acid) is existing in butadiene part of said same or different polymer (case 4).

Reaction caused in case 3 and case 4 is follows.
Butadiene part of acrylonitrile-butadiene is active. To these parts of acrylonitrile-butadiene, unsaturated carboxylic acid (or methacrylic acid) is added and branched or elongates molecular chain by graft polymerization.
Sometimes, branch is caused between active part of another butadiene part of neighboring molecule to which unsaturated carboxylic acid (or methacrylic acid) is added or graft polymerization is caused.

Elastomer composition which bonds with an end group of other acrylonitrile-butadiene elastomer unsaturated carboxylic acid through a part of above mentioned end group, and at least other residual part is left in not bonded state is the first step crosslinking.

Property of elastomer of acrylonitrile-butadiene elastomer unsaturated carboxylic acid obtained by first step crosslink is confirmed to be following state by actual measurement. Range of Mooney viscosity ($ML_{(1+4)}(100°\ C.)$) is 100-220. When Mooney viscosity exceeds 220, molecular weight is too high and processing ability s not so good. When Mooney viscosity is less than 100, it becomes difficult to maintain adequate intensity and to form film. When Mooney viscosity is compared with similar products, 746SXL of Shintomer Co., Ltd., is around 128, 6322 which is conventional product is 122 and Nipol 550 is around 94. Further, Mooney viscosity of general NBR is 30-130.

In crosslink of this step crosslink, it can be understood by Mooney viscosity that the elastomer has higher molecular weight (weight average) than conventional one.
In preparation of emulsion composition by crosslink, since small amount of sulfur is not contained and vulcanizing accelerator is not used, delayed IV type hypersensitivity which is caused by vulcanizing accelerator is not caused.

Emulsion composition obtained in first step crosslink is processed to film at the temperature of 40° C., and film weight swelling ratio can be measured. As the result, film weight swelling ratio is 200-400%.
Film weight swelling ratio is defined as follows.

Film weight swelling ratio (%)=weight (g) after swelling× 100/weight (g) before swelling−100.

Property that the film weight swelling ratio is 200-400% indicates that the film of small amount of crosslinked is obtained without crosslinking treatment only by dry treatment at 40° C. This is caused by first step crosslink, therefore, a glove of sufficient property (tensile strength and intensity to break) can be obtained by not performing sulfur crosslink in the present invention.

Further, the property that the film weight swelling ratio is 200-400% indicates that the product has elasticity.
Emulsion composition obtained in first step crosslink indicates has property of specific Mooney viscosity and film weight swelling ratio mentioned above. Accordingly, it becomes clear that the emulsion composition has elasticity regardless to have respectively high molecular weight.
Emulsion composition of 151 Mooney viscosity, 287% of film weight swelling ratio, and of 180 Mooney viscosity, 336% of film weight swelling ratio can be obtained from active measuring results.

(2) Emulsion elastomer composition crosslinked by first step crosslink and second step crosslink is mentioned below. Elastomer composition whose film weight swelling ratio is 200-400%, being consisted of 25-30 weight % of acrylonitrile, 62-71 weight % of butadiene and 4-8 weight % of unsaturated carboxylic acid (total 100 weight %), covalent bond by bond of at least one part of substituent possessed by said unsaturated carboxylic acid is formed and residual substituent in at least one part of substituent possessed by said unsaturated carboxylic acid is crosslinked by forming ionic bond through bivalent metallic ion. Since the elastomer composition is crosslinked by ionic bond through bivalent metallic ion, Mooney viscosity cannot be measured.

In a case to perform second step crosslink, crosslink by ionic bond through bivalent metallic ion is performed on elastomer composition to which said first step crosslink is already accomplished.
Emulsion composition is prepared by containing 100 phr of elastomer composition, 0.5-4.0 phr of crosslinking agent consisting of bivalent metallic ion, 0.1-2.0 phr of pH adjusting agent to adjust pH to 9-10, 0.5-2.0 phr of dispersing agent and water, said water is added by amount so as the concentration of total solid compound (TSC) to be 18-30 weight %, and by mixing these components.

Said elastomer composition is the emulsion elastomer which is formed in the first step. Concretely, said elastomer composition is a emulsion comprising of 25-30 weight % of acrylonitrile, 62-71 weight % of butadiene and 4-8 weight % of unsaturated carboxylic acid (total 100 weight %), crosslink is performed by bond of at least one part of substituent possessed by said unsaturated carboxylic acid is formed, while residual substituent in at least one part of substituent possessed by said unsaturated carboxylic acid is in the state of free, and crosslinked product is characterized to be 100-220 of Mooney viscosity ($ML_{(1+4)}(100°\ C.)$) and 200-400% of film weight swelling ratio.

Said emulsion consisting of 25-30 weight % of acrylonitrile, 62-71 weight % of butadiene and 4-8 weight % of unsaturated carboxylic acid (total 100 weight %) can be obtained by adding unsaturated carboxylic acid to acrylonitrile-butadiene which possesses or not possesses unsaturated carboxylic acid.

An elastomer composition characterized that end groups of unsaturated carboxylic acid used for a bond by at least a part of substituent possessed by said unsaturated carboxylic acid is forming a bond with one selected from the group consisting of carboxylic group, methylolamide group, reacted product of carboxylic group and diamine and reacted product of carboxylic group and alkyl alcohol, and is bonded with an end group of other acrylonitrile-butadiene elastomer unsaturated carboxylic acid through a part of these end group and at least one part of other part is not bonded.

Regarding an end group of unsaturated carboxylic acid added to acrylonitrile-butadiene carboxylic acid, which is an end group in free state, likewise an end group of unsaturated carboxylic acid added to acrylonitrile-butadiene unsaturated carboxylic acid, which is an end group in free state, can be crosslinked forming ionic bond by bivalent metallic ion, concretely, by zinc metal ion, by above mentioned treatment.

Figure 1:
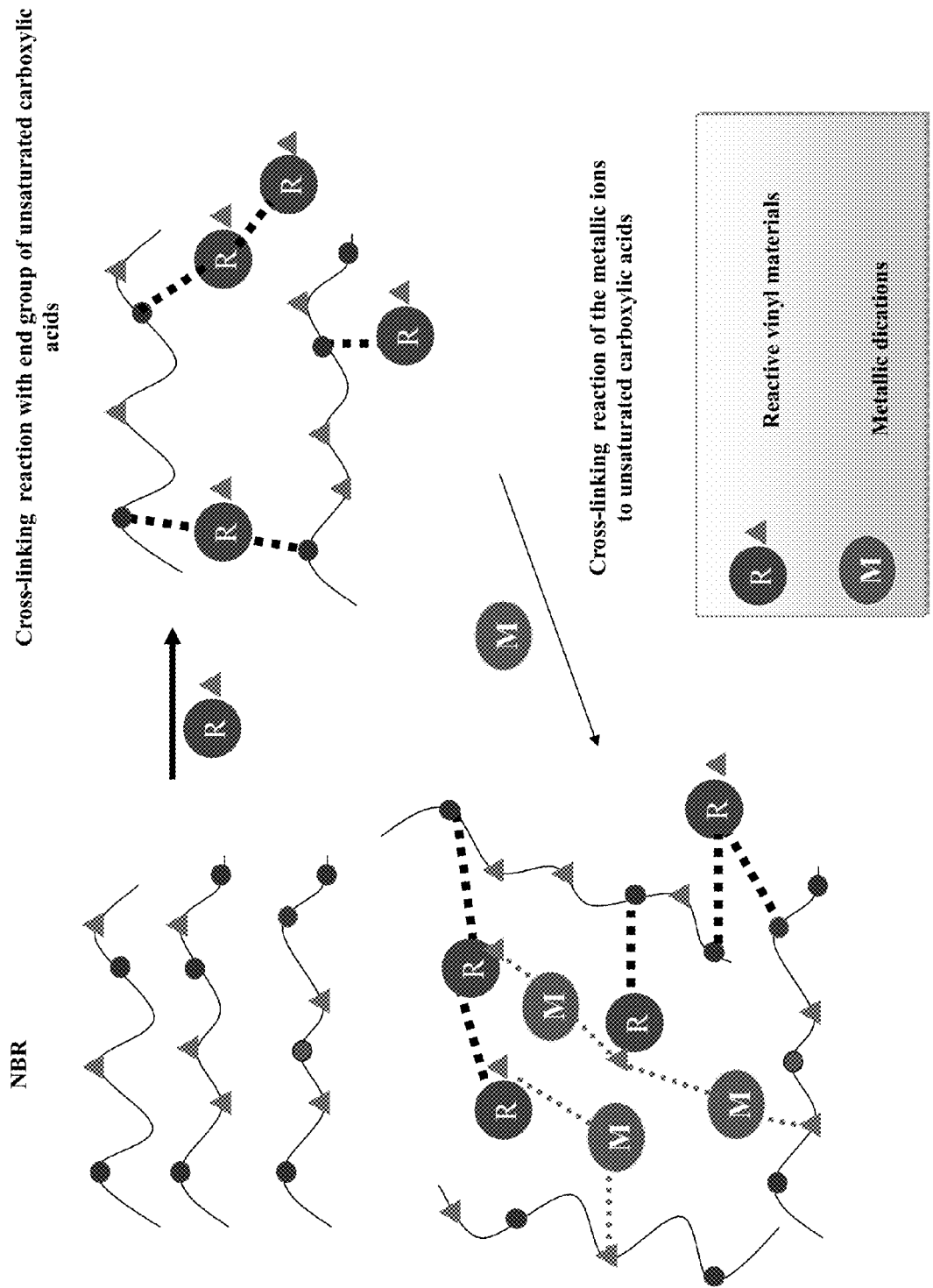

After branch is formed by a reaction to form an end group or after graft polymerization is performed, a carboxylated part by reaction with unsaturated carboxylic acid (or methacrylic acid) and unsaturated carboxylic acid monomer (or methacrylic acid) is bonded by bivalent metallic ion, by reacting with butadiene part, further with other butadiene part. This is illustrated by lower left side drawing of FIG. 1 and left side drawing of FIG. 2.

After branch is formed by a reaction to form an end group or after graft polymerization is performed, some parts remain in the state that the reaction is stopped. Between said parts, ion bonds can be formed by bonding of bivalent metallic ion.

Said crosslinking treatment is considered to cause following reactions on carboxylated acrylonitrile-butadiene. Considerable crosslinking reactions are mentioned below.

(A) Methacrylic acid monomer performs graft polymerization with double bond carbon of butadiene part of carboxylated acrylonitrile-butadien. Carboxyl group of acrylonitrile-butadiene, whose carboxylic group of methacrylic acid is carboxylated, is bonded by ionic bond through zinc ion with carboxylic group of carboxylated acrylonitrile-butadien and forms crosslink.

(B) Methacrylic acid polymer larger than dimmer forms graft polymerization with double bond carbon of butadiene part of carboxylated acrylonitrile-butadien. Carboxylic group of methacrylic acid is bonded by ionic bond through zinc ion with carboxylic group of carboxylated acrylonitrile-butadien and forms crosslink.

(C) Methacrylic acid monomer crosslinks between double bond carbons of butadiene part of carboxylated acrylonitrile-butadien. Carboxyl group of methacrylic acid bonds with carboxyl group of carboxylated acrylonitrile-butadien by ionic bond through zinc ion.

(D) Methacrylic acid polymer larger than dimmer crosslinks between double bond carbons of butadiene part of carboxylated acrylonitrile-butadien. Carboxyl group of methacrylic acid bonds with carboxyl group of carboxylated acrylonitrile-butadien by ionic bond through zinc ion.

A case which uses conventional vulcanization reaction by sulfur and ionic crosslink by metallic ion (left side of FIG. 2) is compared with a case of the present invention, namely, beforehand crosslink by reactive vinyl compound and ionic crosslink by metallic ion (right side of FIG. 2). The former is characterized that alkyl group exists between butadiene part of different polymer and forms crosslink by simple structure, on the contrary, the latter is characterized to use complicated and manifold crosslinking reaction, that is, inner crosslink by unsaturated carboxylic acid (or mathacrylic acid) and crosslink of carboxylic group by ionic bond by zinc oxide through state that forming branch or performing graft polymerization or not through said state. In the case of latter, it can be said that the state of easy crosslinking is formed at crosslink and uses the state.

In the case of latter, it can be understood that unsaturated carboxylic acid (or mathacrylic acid) remains as an unreacted compound in polymer prepared by adding unsaturated carboxylic acid (or mathacrylic acid) to said acrylonitrile-butadien.

Actually, from the measuring results using GCMAS (FIG. 3), in latter (lower drawing of FIG. 3), peak 1 of unsaturated carboxylic acid (or mathacrylic acid) monomer is observed. In upper drawing of FIG. 3, which uses crosslinked elastomer crosslinked using sulfur and sulfur compound, peak 1 of unsaturated carboxylic acid monomer is not observed.

Since this crosslink formation is progressed by emulsion state, a dispersing agent is used. To obtain good dispersed state, use of a surfactant such as alkyl benzene sulfonate, which is anionic surfactant, is indispensable. Said alkyl benzene sulfonate is not a crosslinking agent or a vulcanizing accelerator but a dispersing agent. In emulsion after second step crosslink, alkyl benzene sulfonate, which is an anionic surfactant and a dispersing agent, is contained. By containing said compound, sulfur can be detected. Sulfur as a crosslinking agent or sulfur compound do not exist. By presence of the vulcanizing accelerator containing sulfur compound, contact dermatitis delayed IV type hypersensitivity which is allergic symptom is not made manifest.

Potassium hydroxide is used as a pH adjusting agent. This is used for the purpose to adjust pH to 9-10 as crosslinking condition. And amount to be used is 0.1-2.0 phr. When the amount is less than 0.1 phr or over than 2.0 phr, it is not sufficient to maintain said pH.

As a dispersing agent, anionic surfactant is used. Specifically, sodium salt of naphthalene sulfonate polyaggregate or alkyl benzene sulfonate can be used. Although these compound is sulfur composition and used as a dispersing agent, these compound is detected as sulfur. However, these compounds are not used as a crosslinking agent or a vulcanizing accelerator and do not cause allergy.

Products on the market can be purchased and can be used. For example, Tamol NN9104 can be used. Amount to be used is 0.5-2.0 phr. This dispersing agent is helpful to carry out interfacial polymerization. Or by treating under adequate temperature condition, this agent can be extruded sufficiently.

Titanium dioxide can be added as a whitening agent or a color promoting agent. If necessary, a coloring material can be added. As a coloring material, an organic dye can be used.

As an anti oxidant, specifically, non pollution type polymeric hindered phenol, for example, Wingstay L can be used. In a case to use the composition to prepare said elastomer, adjustment by water to adjust total solid compound (TSC) to 18-30 weight % is carried out at mixing process of each materials.

Property of acrylonitrilebutadien unsaturated carboxylic acid on which second step crosslink is performed after first step crosslink, specifically behavior of dynamic viscoelasticity is investigated and following point are confirmed.

In the present invention, sulfur or sulfur containing compound are not used as a crosslinking agent or a vulcanizing accelerator in the first step. This invention does not contain sulfur or sulfur containing compound and is different from conventional crosslink product from this point, and this invention can form crosslink which does not cause delayed IV type hypersensitivity (in a case when anionic surfactant is used as a dispersing agent, the amount is small, and does not cause delayed IV type hypersensitivity).

According to the measuring results of dynamic viscoelasticity mentioned below, product of the present invention can improve the effect of crosslink according to crosslinking treatment by first step crosslink and second step crosslink. Especially, effects caused by use of zinc are follows.

Figure 7:
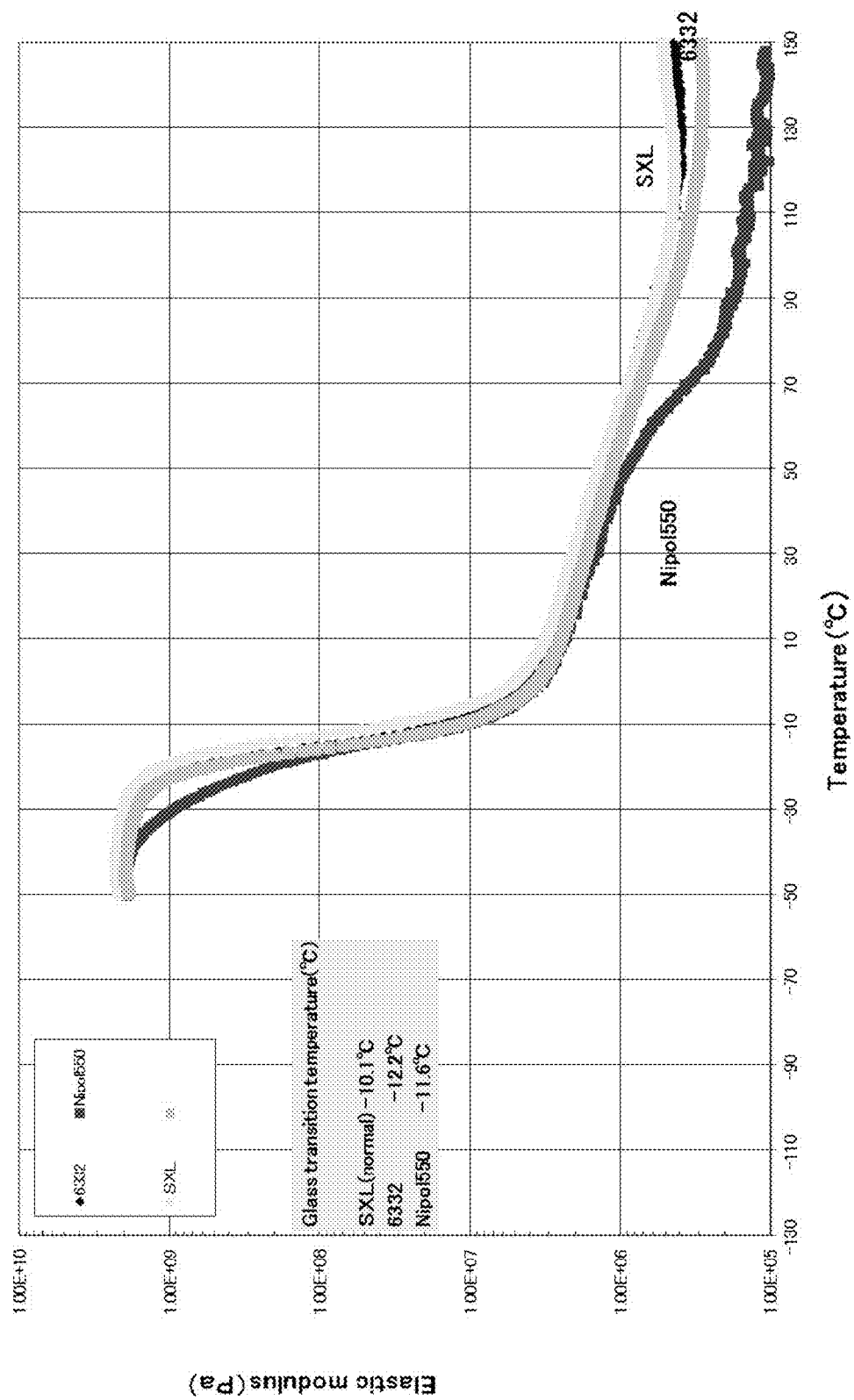
FIG. 7 is a drawing comparing loss tangent tan δ of SXL (present invention glass transition temperature is −10.1° C.), 6322 (glass transition temperature is −12.2° C.) and Nipol 550.

(1) Temperature that indicates maximum value of loss tangent indicated by tan δ(ratio of storage elastic modulus/loss elastic modulus) is corresponding to glass transition temperature (Tg) at the transition temperature region from rubber is in freezing state to start micro Brownian motion, and glass transition temperature becomes high when basic molecular motion is depressed (be hard to move), for example, rigid molecular chain or crosslinking density becomes large (refer to FIG. 7).

Acrylonitrile-butadien unsaturated carboxylic acid of the present invention (indicated by SXL) is measured as −10.1° C. In a case of 6322, which is a conventional product, glass transition temperature is −12.2° C., and in case of Nipol is −11.6° C.

Acrylonitrile-butadien unsaturated carboxylic acid of the present invention (indicated by SXL) shows higher results when compared with other product. The reason why is considered as follows, that is, because the degree of enmesh, namely, crosslinking density by self crosslinking is high. Further, it is observed that Nipol 550 is extremely short.

(2) Storage elastic modulus of flat rubber state region which is high temperature region higher than glass transition temperature becomes high when crosslinking density by enmeshing becomes higher and molecular weight (Mc) between crosslinking chain becomes shorter. Length of flat part of rubber state region (temperature region) is known to indicate correlation with enmeshing number per one molecule.

According to FIG. 7, increase of elastic modulus of acrylonitrile-butadiene unsaturated carboxylic acid gloves prepared by zinc adding vulcanization at flat part of rubber state region is larger than that of sulfur vulcanization product. That is, increase of elastic modulus by adding zinc is large, and it reflects improvement of crosslinking density by addition of zinc.

Figure 8:
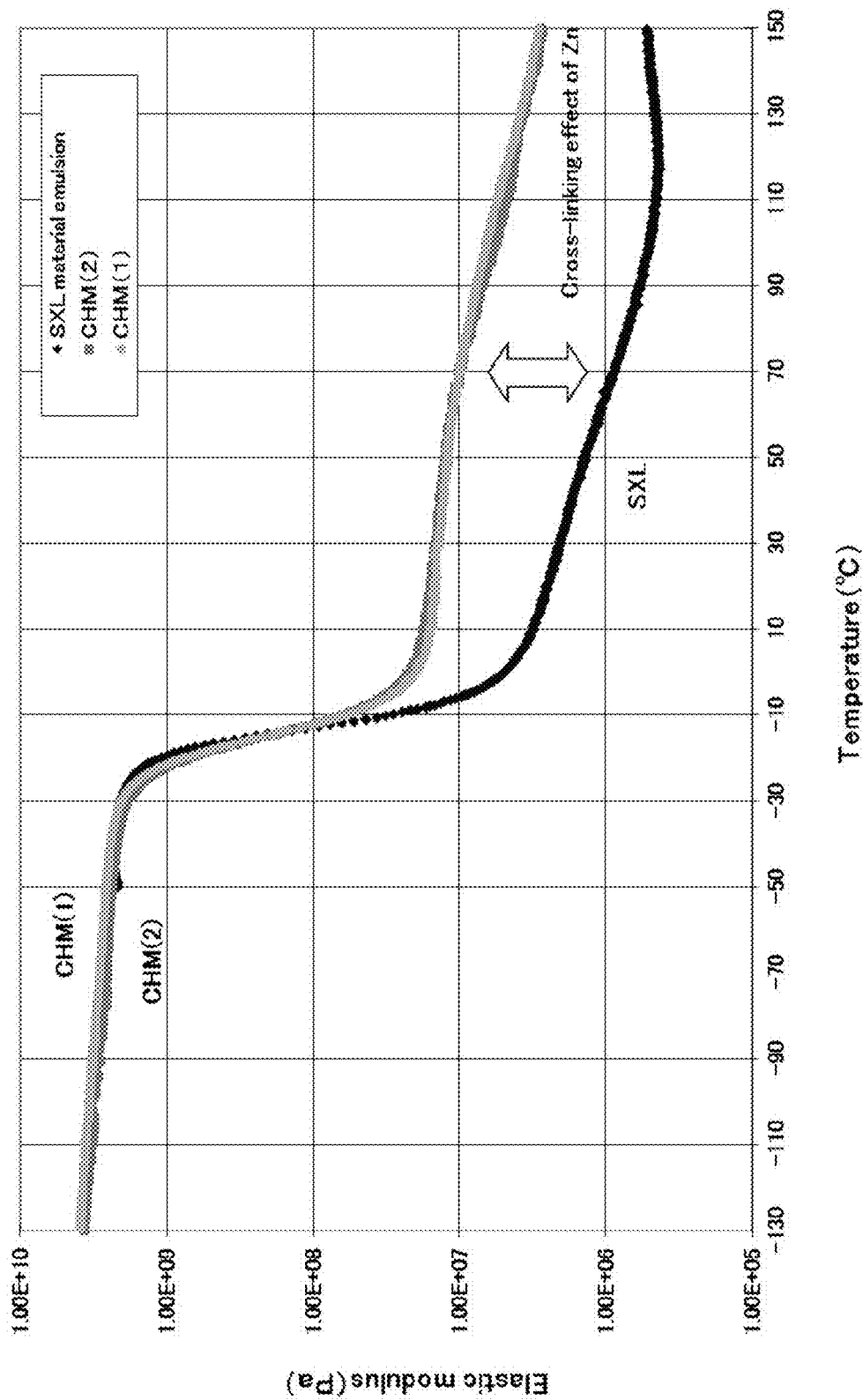
FIG. 8 is a drawing comparing loss tangent tan δ of CHM materials emulsion and glove product.
Figure 9:
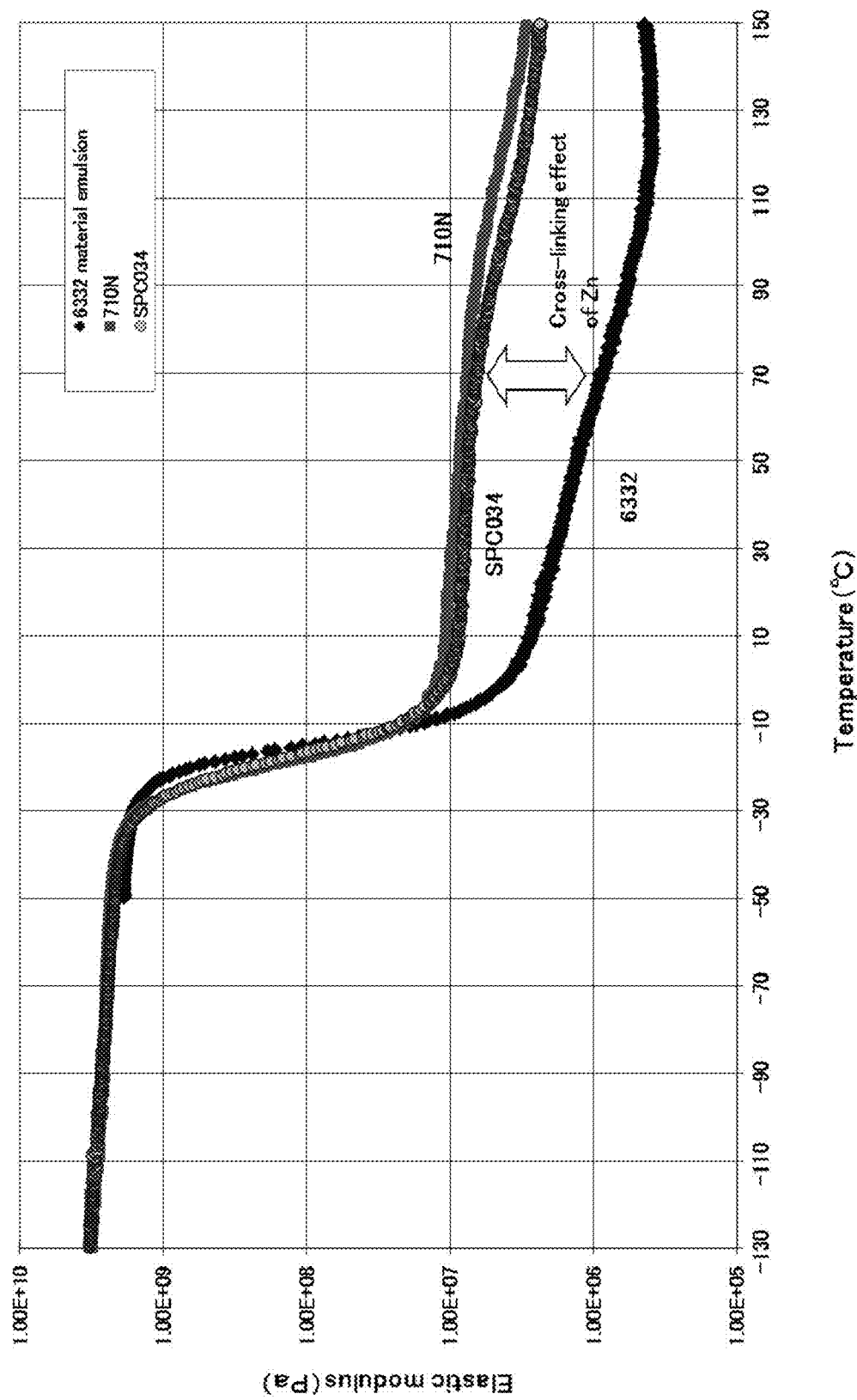
FIG. 9 is a drawing comparing loss tangent tan δ of sulfur vulcanized materials emulsion and glove product.
Figure 10:
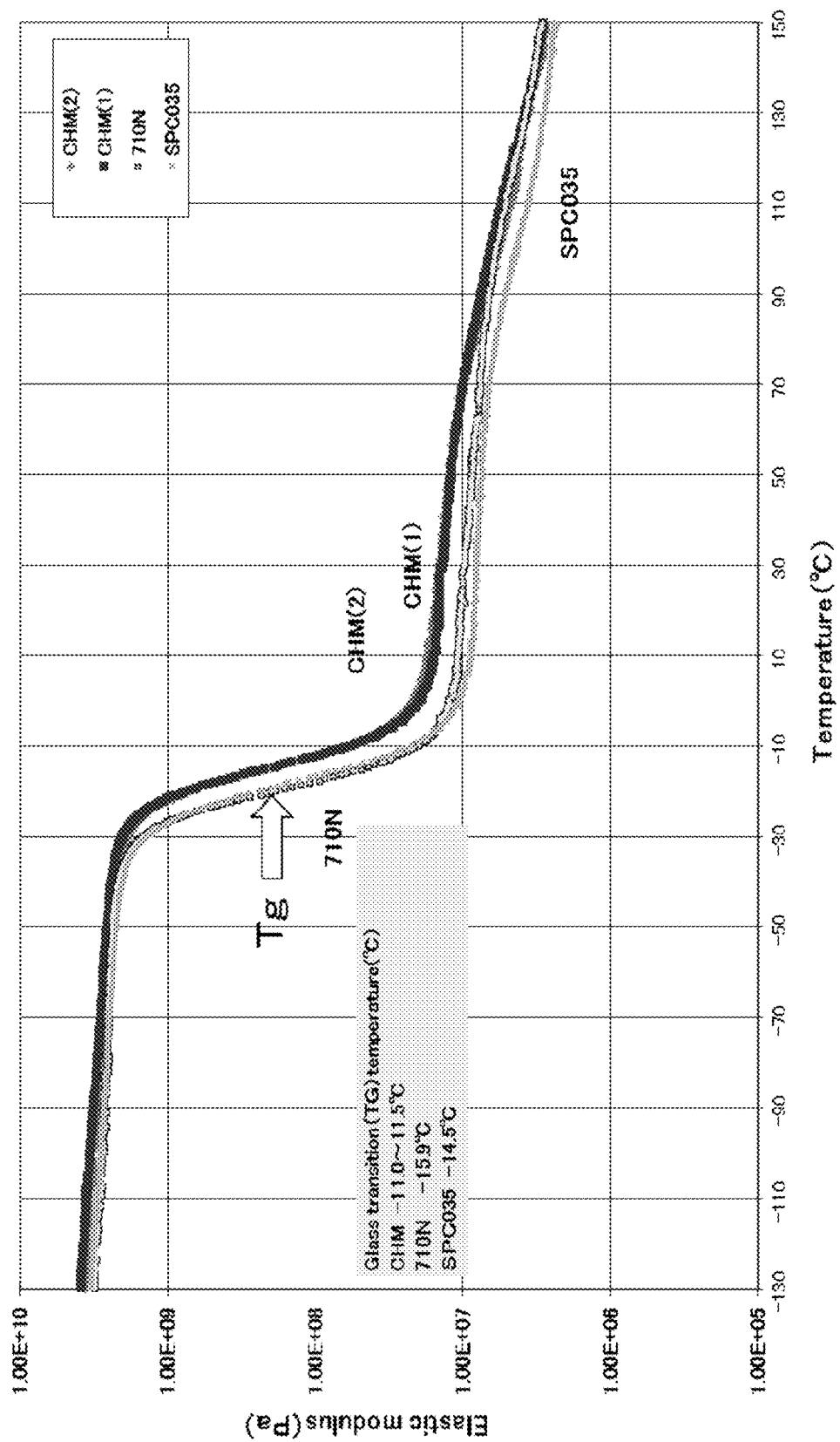
FIG. 10 is a drawing comparing loss tangent tan δ of CHM materials emulsion (starting materials of the present invention) and sulfur vulcanized materials.
Figure 11:
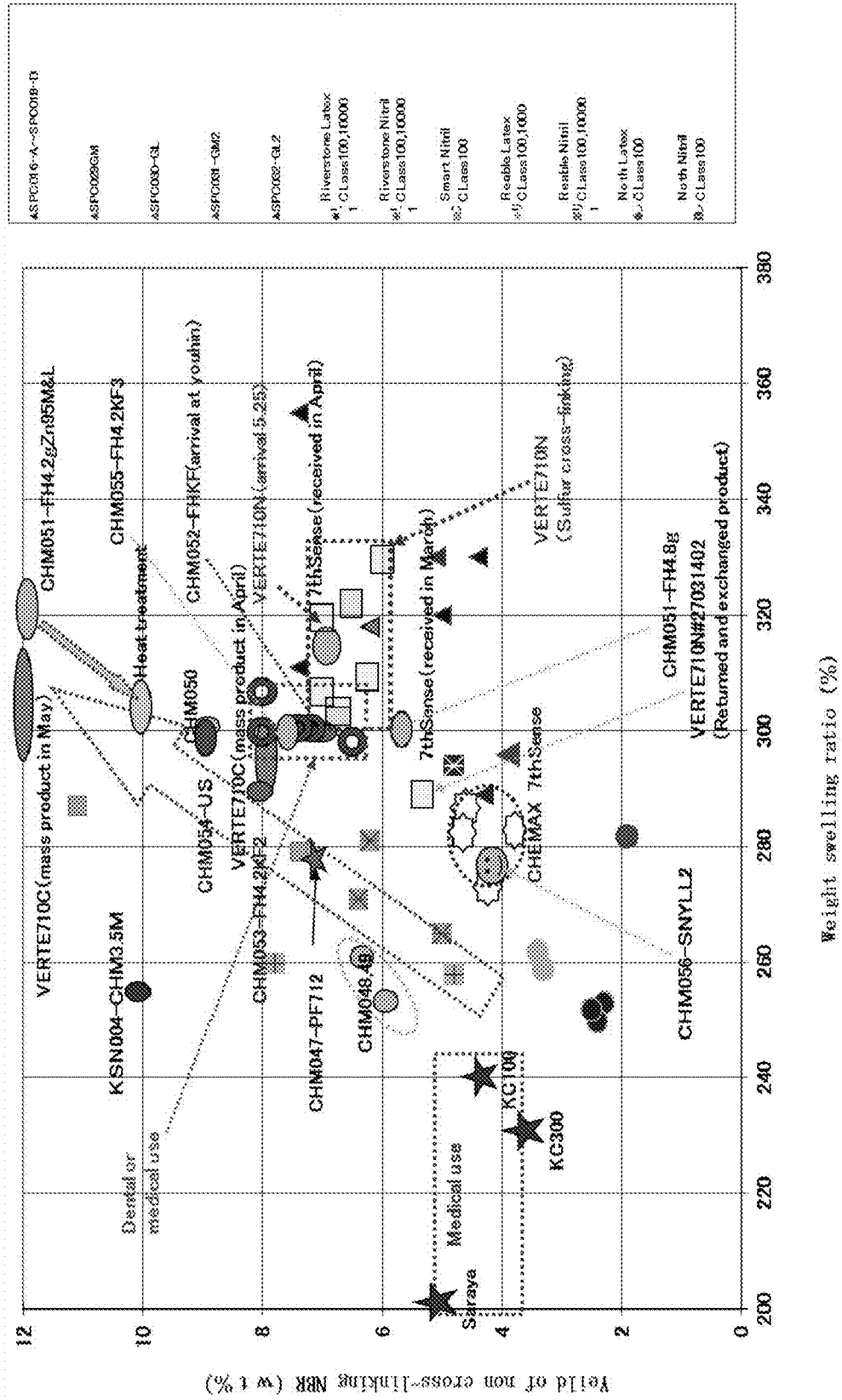
FIG. 11 is a drawing which investigates relationship of amount of non vulcanized rubber and weight swelling ratio.

According to FIG. 8, Tg temperature of gloves made of acrylonitrile-butadiene unsaturated carboxylic acid (from −11.0 to 1.5° C.) is higher than that of sulfur vulcanized rubber (from −14.5 to −15.9° C.) and this tendency is caused by following phenomenon. That is, elastic modulus decreases and sifts to higher temperature side, width of transition temperature extends, storage elastic modulus drops slowly and elastic modulus of flat part becomes higher.

From FIGS. 7 and 8, effect of addition of the present invention can be confirmed.

Prescription to perform second step crosslinking treatment after first step crosslinking treatment are shown in Table 1.

TABLE 1

| Name of agent | Phr |
|---|---|
| Elastomer emulsion consisting of unsaturated carboxylic acid and acrylonitrile-butadiene to which first step closslink is performed | 100 |
| KOH (alkaline compound) | 0.1-0.2 |
| zinc oxide (crosslinking agent) | 0.5-4.0 |
| titanium dioxide (white) | 0.2-3.0 |
| dispersing agent | 0.5-2.0 |
| anti oxidant | 0.1-1.5 |
| coloring agent | voluntarily |
| water to bring solid phase to 18-30 weight % | voluntarily |

Gloves made of thin film of elastomer formed by following processes.

Gloves made of elastomer is prepared by following processes. That is, the elastomer is comprising 25-30 weight % of acrylonitrile, 62-71 weight % of butadiene and 4-8 weight % of unsaturated carboxylic acid (total 100 weight %), crosslinked by a bond by at least one part of substituent possessed by said unsaturated carboxylic acid is formed and residual substituents of at least one part of substituents possessing unsaturated carboxylic acid is crosslinked by bivalent metal, and does not contain sulfur which is a crosslinking agent and sulfur compound which is a vulcanization accelerator, further Mooney viscosity ($ML_{(1+4)}(100°$ C.)) of said elastomer which is crosslinked by a bond by at least one part of substituent possessed by said unsaturated carboxylic acid is 100-220. Gloves of thin film made of the elastomer does not contain sulfur which is a crosslinking agent and sulfur compound which is a vulcanization accelerator, thickness is 0.05-0.15 mm, swelling ratio at glove preparation is from 240 to 320, tensile stress is 22-35 MPa, breaking elongation is 32-35%, elongation at breaking is 480-620% and tensile stress at 500% elongation is 15-35 MPa.

(a) process to wash a mold or a former by washing water so as to remove stains, then to wash with cold water and to dry it. Dried mold or former is treated by direct dipping method or coagulate dipping method. Selection of these methods is depending on a kind of product. Direct dipping method is to dip dried mold or former into a mixture prepared by a recipe of the present invention.

(b) process to dip the mold or former into solution of coagulant containing 8-17 weight % of $Ca^{2+}$ ion.

The coagulant is prepared as an aqueous solution which contains 8-17 weight %, desirably 8.0-17.0 weight % of calcium by adding calcium nitrate in water so as to adjust contents of $Ca^{2+}$ ion. The mold or the former is dipped in said solution. Consequently, coagulant is stuck on the surface of the mold or the former. Time for dipping is 10-20 seconds. A wetting agent or an anti adherence agent can be added, concretely, zinc stearate and calcium stearate.

(c) process to dry the mold or the former to which coagulant is stuck at 50-70° C. and to dry whole or partial surface of the gloves.

The mold or former to which coagulant is stuck is stuck by 50-70° C. and to dry whole or partial surface of the gloves.

(d) process to dip the mold or former obtained in (c) process to which coagulant is stuck and dried into elastomer composition of the present invention for 1-20 seconds under temperature condition of 25-35° C.

By dipping the mold or former to which coagulant is stuck into composition to prepare elastomer for 15 seconds under temperature condition of 25-30° C., and the elastomer is stuck. Dipping process can be repeated several times. Ordinary, this process is repeated 2 times or more.

(e) process to wash the mold or former by water and remove agents (leaching process).

A former which is coated partially by dried latex is leached in a leaching tank containing hot water (30-70° C.).

(f) Beading (sleeve winding process)

After leaching process, beading (sleeve winding process) is carried out.

(g) drying process in a furnace

A glove former is dried at 80-120° C. for 250-300 seconds.

(h) process to crosslink and harden the mold or former obtained in said (g) process at 120-150° C. for 20-30 minutes.

By the state that the composition to prepare elastomer on the surface of the mold or former, heat treated at 120-150° C. for 20-30 minutes so as to crosslink and harden.

(i) after post leaching (contained agents are removed by washing with water) the surface of elastomer film containing bivalent metal stuck on the surface of mold or former obtained in (h) process, process to dry the elastomer film.

Post leaching is performed at 30-80° C. for 60-80 seconds.

(j) after post leaching of said (i) process and drying process, the surface of elastomer film is treated by chlorine so as to remove sticky feeling (tackiness), further treated by neutralization.

Chlorine treatment is carried out by dipping crosslinked elastomer film in dried state on the mold or former into aqueous of chlorine concentration of 50-200 ppm in treating vessel. As the result, surface of elastomer film having a shape of glove is reacted and thickness of the surface is slightly reduced.

(k) elastomer film whose surface is treated by chlorine on the mold or former obtained in said
(j) process is washed with water, then dried. In this process, sticky feeling (tackiness) of the surface is removed.
The glove is took off from the mold or former by turning over, therefore, chlorine treated side becomes an inner side at wearing, and inner side of the glove can be non sticky feeling side.
(l) process to take off chlorine treated elastomer film from the mold or former and to turn over it.
Chlorine treated elastomer film on the mold or former is took off from the mold or former and turn over so as the treated surface be a reverse surface. Until this process is online process. Portion which contact with hand in glove is made slippery, and a glove which promises a state of easy slipping of hand in glove can be obtained.
(m) process to insert the glove into chlorine treatment vessel, and chlorinized the outer surface of the glove.
The glove is inserted into chlorine treatment vessel, aqueous solution of chlorine is poured so as to dip the glove, then performs off line chlorine treatment. Condition of chlorine treatment is mentioned below.
The glove is inserted into chlorine treatment vessel, aqueous solution of chlorine is poured so as to dip the glove, then performs off line chlorine treatment. The chlorine treatment vessel provides a cylindrical basket turning sideway, and by rotating the basket containing the glove chlorine treatment is performed. Chlorine treatment condition is mentioned as follows.

Previous washing: 7-13 minutes
Chlorine concentration: 50-70 ppm
Temperature of chlorine water: 25-30° C.
Chlorine treatment time: 7-13 minutes
Neutralizing time: 5-10 minutes
Rinsing 1: 10 minutes
Rinsing 2: 10 minutes
Rinsing 1: 10 minutes
Previous dry: 13-18 minutes at room temperature
Drying temperature 70° C.±15° C.
Drying time: 160-200 minutes (tumbler dryer is used)
cooling time: 20-40 minutes (n) process to wash the glove whose outer surface is chlorinated in (m) process by pure water Continually, washed by pure water.

Quantity: 5000 pieces of glove (30 kg)
Amount of water: 500-600 L (first and second)
Condition of pure water: ion exchanged water which has resistivity of more than of 18 MΩ·cm
Temperature of water: 20-30° C.
Washing time: 10-20 minutes ($1^{st}$ time and $2^{nd}$ time)
Washing procedure: after washing (first time), there are processes of water discharge, washing, washing, dewater by centrifuge and drying [there is no dewatering process between first and second washing process]
Drying temperature: 65° C.±15° C.
Drying time: 1 hour Chlorine Treatment The chlorine treatment process to remove sticky feeling (tackiness) of the surface can be carried out as follows. A mold or former having a film of glove shape made of dry state vulcanized elastomer on the surface into chlorine solution in a treatment vessel. As the result, surface of elastomer film having a shape of glove is reacted and thickness of the surface is slightly reduced. After treatment is over, washed by water and dried. This treatment is for inner surface of glove, therefore, after treatment is over, take off from the mold or former and turned over. Namely, surface which was inner surface becomes outer surface. Then turned over glove on the mold or former is dipped into chlorine aqueous solution of 30 ppm-180 ppm desirably 50-100 ppm for 5-25 minutes. Accordingly, impurity metal contained in elastomer surface becomes chloride and solubility becomes large, therefore becomes easy removed by washing with pure water. When concentration of chlorine is too low, said effect is small and eluting metal becomes large, and when concentration of chlorine is too high, it adds to double bond of butadiene and harden the glove and damage the surface.
After the glove of elastomer film from which metallic ion is removed in above mentioned process, the glove of elastomer film is took out.
Since the surface is reacted, tackiness of the glove is decreased. This glove is used by turning over at the actual use, a hand can be inserted slippery.

In above mentioned processes, main process are as follows.
(a) process to dip the mold or the former into solution of coagulant containing 8-17 weight % of $Ca^+$ ion.
(b) process to dry the mold or the former to which coagulant is stuck by 50-70° C. and to dry whole surface of the gloves or a part.
(c) process to dip the mold or the former to which coagulant is stuck obtained in said (b) process into composition to prepare elastomer for 1-20 seconds under temperature condition of 30° C.
(d) process to dry the mold or the former obtained in (c) process at 80-120° C.
(e) process to crosslink and harden the elastomer on the surface of the mold or the former obtained in (d) process at 120-150° C. for 20-30 minutes.
(f) process to treat the elastomer on the former by chlorine and dry after neutralization washing (online washing process)
(g) process to remove the glove by turning over from the former and to carry out chlorine treatment (off line washing process).
(h) process to wash the glove after off line treatment by chlorine.

Properties of the gloves obtained in the present invention are mentioned below.
As shown in Examples, the gloves of the present invention does not contain Dermal sensitization study crosslinking agent which contains sulfur and sulfur compound and a vulcanizing accelerator which contains sulfur.
Analysis of components (11 components: C, H, N, O, S, Zn, Ca, Cl, Na, K and Ti) of specimen of rubber glove is carried out. From the results of quantitative analysis using an ICP emission spectrometry analysis equipment, 0.31 weight % of sulfur is detected. This sulfur is considered to be originated from sulfone group of anionic surfactant used as a dispersion. All analytical results are shown in Table 5 of Example 4 and Table 6 of Example 5. Relationship between properties of the present invention, that is, Mooney viscosity, glove swelling ratio, Zn, braking elongation and tensile stress at 500% elongation are shown in Table 2.

TABLE 2

| Mooney viscosity $ML_{(1+4)}$ (100° C.) | glove swelling ratio (%) | ICP analytical result Zn | braking elongation (%) | tensile stress at 500% elongation (%) |
|---|---|---|---|---|
| 110 | 290 | 0.8 | 560 | 24 |
| 110 | 280 | 0.9 | 580 | 28 |
| 140 | 280 | 0.8 | 540 | 26 |
| 140 | 240 | 1.0 | 520 | 31 |
| 180 | 300 | 0.8 | 530 | 25 |
| 180 | 270 | 0.9 | 510 | 32 |

TABLE 2-continued

| Mooney viscosity ML$_{(1+4)}$ (100° C.) | glove swelling ratio (%) | ICP analytical result Zn | braking elongation (%) | tensile stress at 500% elongation (%) |
|---|---|---|---|---|
| 220 | 320 | 0.7 | 600 | 17 |
| 220 | 270 | 0.9 | 530 | 24 |

Comparison with other gloves are summarized in Table 3

TABLE 3

|  | 746 SXL | 6322 | Highpore 550 |
|---|---|---|---|
| solid component (wt %) | 45.1 | 45.6 | 44.9 |
| solvent soluble component (wt %) |  |  |  |
| ① acetone soluble component | 30.0 | 30.1 | 50.6 |
| ② THF soluble component | 33.1 | 32.0 | 98.6 |
| element in solid component |  |  |  |
| C (wt %) | 78.2 | 78.8 | 79.0 |
| H (wt %) | 9.8 | 10.0 | 9.9 |
| N (wt %) | 7.53, 7.48 | 7.5, 7.52 | 6.51, 6.62 |
| S (wt %) | 0.3 | 0.5 | 0.5 |
| others (wt %) |  |  |  |
| water content in solid component | — | — | — |
| acrylonitrile (wt %) | 28 | 28 | 25 |
| volatile component in emulsion film (ppm) | 370 | 13 | 188 |
| carboxylic acid (wt %) | 4.07 | 4.01 | 3.76 |
|  | 4.15 | 4.36 | 3.73 |
| average | 4.1 | 4.2 | 3.7 |
| Mooney viscosity ML$_{(1+4)}$(100° C.) | 151 | 122 | 94 |
| ML$_{(1+4)}$(140° C.) | — | — | — |
| viscosity of solution (mPa·s) | 26 | — | — |
| particle size distribution |  |  |  |
| ① average particle size (nm) | 176 | 178 | 141 |
| ② standard deviation (nm) | 19 | 30 | 24 |
| dynamic viscoelasticity |  |  |  |
| glass transition temp. (Tg) (° C.) | −10.1 | −12.2 | −11.6 |
| length of rubber region (° C.) | Tg~150 | Tg~150 | Tg~50 |
| elastic modulus of rubber region (MPa at 150° C.) | 0.52 | 0.44 | 0.09 |
|  |  | solid part: 45.6% |  |

In Example 7, test results of skin susceptibility are indicated (Table 12). In the present invention there is no case to cause delayed IV type hypersensitivity, and it is understood that there is no problem in health. When compared with conventional product, regarding Ca, Na and K, these items indicate lower analytical value.

Measuring results of thickness of the elastomer thin film gloves of the present invention shows that there is difference depending on the measured position, however is from 0.05 to 0.15 mm. Measuring results of tensile stress (intensity) of the elastomer thin film gloves of the present invention is 22-35 MPa and breaking elongation is 480-620%. Modulus between 10-15 MPa of the elastomer thin film gloves of the present invention is 500%. These facts are illustrated in Example 6 and results are shown in Table 7. These results indicate that the gloves of the present invention is equal to the conventional gloves which uses sulfur and sulfur containing compound (Table 8).

Example 1

Mixture of methacrylic acid added to acrylonitrile-butadiene prepared by adding methacrylic acid to acrylonitrile-butadiene to which previously mathacrylic acid is added or not added (product of Syntomer Co., Ltd.: product name is Syntomer 746-SXL) is mixed with potassium hydroxide, zinc oxide, titanium dioxide, a dispersing agent, an anti oxidant, a coloring agent and water and a composition of concentration indicated in Table 2 is prepared. Using this composition an elastomer thin film which does not contain sulfur as a crosslinking agent and a vulcanizing accelerator is prepared.

TABLE 4

| agents | phr |
|---|---|
| 746SXL elastomer emulsion of Syntomer Co., Ltd. on which first step crosslinking treatment is performed | 100 |
| KOH | 1.35 |
| zinc oxide | 1.2 |
| titanium dioxide | 0.75 |
| dispersing agent | 1.5 |
| anti oxidant | 0.25 |
| coloring agent | 0.05 |
| water to bring solid phase to 18-30 weight % | voluntarily |

Example 2

Using a composition composed of a mixture obtained according to Table 4, a gloves made of elastomer thin film by dipping method mentioned below.

(a) process to wash a mold or former by washing water so as to remove stains, then wash with cold water and to dry.

Dried mold or former is treated by direct dipping method or coagulation agent dipping method. Selection of these methods is depending on a kind of product. Direct dipping method is to dip dried mold or former into a mixture prepared by a recipe of the present invention.

(b) process to dip the mold or former into solution of coagulant containing 8-17 weight % of Ca$^{2+}$ ion.

The coagulant is prepared as aqueous solution which contains 10 weight % of Ca$^{2+}$. The mold or former is dipped in said solution. Consequently, coagulant is stuck on the surface of the mold or the former. Time for dipping is 10-20 seconds. A wetting agent or an anti adherence agent can be added. Concretely, zinc stearate and calcium stearate.

(c) process to dry the mold or the former to which coagulant is stuck by 60° C. and to dry whole or partial surface of the gloves.

(d) process to dip the mold or the former obtained in (c) process to which coagulant is stuck and dried into elastomer composition of the present invention for 1-20 seconds under temperature condition of 30° C.

By dipping the mold or former to which coagulant is stuck into composition to prepare elastomer for 15 seconds under temperature condition of 30° C., and the elastomer is stuck. Dipping process can be repeated several times. Ordinary, this process is repeated 2 times or more.

(e) process to wash the mold or the former obtained in (d) process by water and remove agents (leaching process).

The former which is coated partially by dried latex is leached in a leaching tank containing hot water (30-70° C.) for 90-140 seconds.

(f) process to bead (sleeve winding process) the mold or the former obtained in (e) process. After leaching process, the mold or the former are beaded (sleeve winding process).

(g) process to dry the mold or the former obtained in (f) process in a furnace.

The glove former is dried at 120-150° C. for 250-300 seconds.

(h) process to crosslink the mold or the former obtained in (g) process.

Dried latex coated on the glove former is crosslinked at the condition of 120-150° C. for 20-30 minutes.

(i) process to dry the crosslinked elastomer on the surface of the mold or the former obtained in (h) process after post leaching (to remove contained agent by washing with water).

The post leaching is carried out by the condition of 30-80° C. for 60-80 seconds. The process is carried out by dividing to two times.

(j) As a desirable process, the surface of gloves is treated by chlorine.

By above mentioned continuous processes, a thin film glove of elastomer can be prepared.

Example 3

Comparative Example is Mentioned

Mixture of methacrylic acid added to acrylonitrile-butadiene prepared by adding methacrylic acid to acrylonitrile-butadiene to which previously mathacrylic acid is added or not added (product of Syntomer Co., Ltd.: product name is Syntomer 746-SXL) is mixed with potassium hydroxide, zinc oxide, titanium dioxide, a dispersing agent, an anti oxidant, a coloring agent and water and a composition of concentration indicated in Table 2 is prepared. In the comparative Example, composition containing carboxylated acrylonitrile-butadiene latex (product of Synthomer Co., Ltd. product name is Synthomer 6322), ZnO (1.5 weight %) and sulfur (1.0 weight %) is used and a gloves is prepared, and these two gloves are compared. Regarding zinc oxide, a dispersing agent, a pH adjusting agent and an anti oxidant are same as mentioned in Examples. Weight of solid phase is 30 weight %. According to the processes mentioned in Example 2, gloves product (product name is Verte 10N) is prepared.

Example 4

Comparison results of component analysis of the product of the present invention and product of Comparative Example (Verte 710N) are summarized in Table 5.

Analysis of components (11 components: C, H, N, O, S, Zn, Ca, Cl, Na, K and Ti) of specimen of rubber glove is carried out by CHNO Analyzer (EA1110 of CE Instruments) and ICP-AES system.

Quantitative analysis of sulfur is mentioned below.

Quantitative analysis of Zn and Ca is follows. Approximately 0.1 g of each evaporated residue is weighted and contained in platinum crucible and fused by mixed flux ($Na_2CO_3$: $Na_2B_4O_7$=2:1) and extracted by 30 ml of hydrochloric acid ($HCl:H_2O$=1:1). Then the extracted solution is diluted to 100 ml and quantitatively analyzed by an absorbancy analyzer. Regarding Cl, 1 g of each evaporated residue is weighted and contained in platinum crucible and fused by Eschka mixture and extracted with 100 ml of pure water, and the aqueous solution is quantitatively analyzed by an absorbancy analyzer. Further, regarding sulfur, said aqueous solution is used and quantitatively analyzed using ICP emission spectrometry analyzer.

Contents of Sulfur.

Contents of sulfur in the gloves of the present invention is 0.31 weight %. While in Verte 710N, contents of sulfur is 1.10 weight %.

Contents of Zinc.

Contents of zinc in the gloves of the present invention is 0.76 weight % and relatively small. While, in a case of conventional product, contents of zinc is 1.15 weight %. Contents of zinc in the gloves of the present invention is smaller than that of conventional one.

TABLE 5

| component | C | H | N | O | S | Zn |
|---|---|---|---|---|---|---|
| present invention | 77.9 | 9.8 | 7.1 | 3.0 | 0.31 | 0.76 |
| conventional | 73.1 | 9.2 | 6.6 | 4.9 | 1.1 | 1.15 |

| component | Ca | Cl | Na | K | Ti |
|---|---|---|---|---|---|
| present invention | 0.76 | 0.19 | 0.01 | 0.01 | 0.36 |
| conventional | 0.62 | 0.16 | 0.02 | 0.02 | 1.1 |

(unit: weight %)

Example 5

Comparison of Acetone Soluble Component

Amount of light component (unreact ratio, unvulcanized NBR) in rubber glove: based on JISK 6299 (method for quantitative analysis of solvent extract of rubber). Extracted by acetone solvent using Soxhlet extractor for 24 hours and calculated. Qualitative analysis of acetone extract is carried out by Infrared spectroscopy (FT-IR) analyzer.

As a measuring apparatus of FT-IR, IRP Prestage-21/FTIR-8400S of Shimadzu Seisakusho Co., Ltd., is used. Measuring method is transmission method (diamond cell is used) and numbers of integration is 40.

Swelling ratio of a specimen from rubber glove is carried out as follows. The specimen is dipped into toluene solvent, and weight increase (as a method to measure vulcanization state simply following method is generally used. That is, when a specimen is dipped into good solvent of vulcanized rubber, in a case of crosslinked polymer e.g. vulcanized rubber, the specimen is suppressed by elasticity of network and reaches to swelling equilibrium state. Vulcanization density of vulcanized rubber is in reverse proportional relationship with equilibrium swelling ratio) after 72 hours is measured at ordinary temperature, weight swelling ratio of each specimen (weight of specimen after swelling×100/weight of specimen before swelling, unit: %) is calculated, and this value is crosslinking density of vulcanized rubber.

Acetone soluble component of glove of the present invention is; 11.3 weight %, 12.0 weight %, 10.5-15 weight % and that of conventional Verte 710N (KLT-C) is 7.7 weight %. Weight swelling ratio of glove of the present invention is 340%, and that of conventional Verte 710N (KLT-C) is 374% (Table 6).

From IR analysis results of acetone soluble component, presence of unreacted nitrile-butadiens is detected.

In the case of the present invention, absorption peak of carboxylic acid group is detected at closely to 1700 $cm^{-1}$.

In Table 4, results of metal elements analysis are recorded. Said analysis is carried out at surface and reverse surface of the third finger position of the glove.

TABLE 6

| specimen | Mooney viscosity of elastomer | *non reaction ratio | wt. swelling ratio | Position | method | analysis of elements | | | | | | | | | | | Total wt. % |
|---|---|---|---|---|---|---|---|---|---|---|---|---|---|---|---|---|---|
| | | | | | | C | O | Al | Si | S | Cl | K | Ca | Ti | Zn | Na | |
| Lot 1 | 140 | 8.1 | 287 | A | EDX | 83.4 | 3.9 | 0.1 | | 1.0 | | | 5.2 | 3.9 | | 0.4 | 100 |
| | | | | B | EDX | 75.8 | 3.5 | | | 0.8 | 11.9 | 0.2 | 3.2 | 1.6 | 2.6 | 0.4 | 100 |
| | | | | C | ICP | | | | | 0.46 | | | | | 0.79 | | 1.3 |

TABLE 6-continued

| specimen | Mooney viscosity of elastomer | *non reaction ratio | wt. swelling ratio | Position | method | C | O | Al | Si | S | Cl | K | Ca | Ti | Zn | Na | Total wt. % |
|---|---|---|---|---|---|---|---|---|---|---|---|---|---|---|---|---|---|
| Lot 2 | 180 | 4.5 | 249 | A | EDX | 87.2 | 1.9 | | | 0.8 | 2.6 | | 3.7 | 1.0 | 2.8 | | 100 |
| | | | | B | EDX | 86.6 | 3.0 | | | 0.8 | 4.1 | | 2.0 | 0.9 | 2.6 | | 100 |
| | | | | C | ICP | | | | | 0.40 | | | | | 0.83 | | 1.2 |
| Lot 3 | 190 | 8.0 | 281 | A | EDX | 84.0 | 1.9 | | | 1.2 | | | 4.4 | 3.7 | 4.4 | 0.4 | 100 |
| | | | | B | EDX | 76.0 | 2.8 | | | 0.8 | 12.3 | | 3.3 | 2.0 | 2.4 | 0.4 | 100 |
| | | | | C | ICP | | | | | 0.38 | | | | | 0.71 | | 1.1 |
| Lot 4 | 220 | 9.9 | 317 | A | EDX | 84.3 | 4.8 | | | 1.0 | | | 5.1 | 1.9 | 2.6 | 0.3 | 100 |
| | | | | B | EDX | 75.3 | 3.5 | | | 0.9 | 12.6 | 0.2 | 3.7 | 1.6 | 2.1 | 0.1 | 100 |
| | | | | C | ICP | | | | | 0.45 | | | | | 0.6 | | 1.1 |
| on the market 1 | | 4.6 | 241 | A | EDX | 81.4 | 6.0 | | | 1.8 | | | 3.4 | 5.0 | 1.9 | 0.5 | 100 |
| | | | | B | EDX | 77.0 | 5.9 | 0.1 | | 1.9 | 6.5 | | 1.2 | 5.2 | 1.8 | 0.4 | 100 |
| | | | | C | ICP | | | | | 1.05 | | | | | 1.35 | | 2.4 |
| on the market 2 | 80 | 6.5 | 309 | A | EDX | 87.3 | 1.7 | | | 3.0 | | | 1.4 | 2.5 | 3.6 | 0.3 | 100 |
| | | | | B | EDX | 83.7 | 3.4 | | 0.1 | 2.4 | 5.9 | | 1.0 | 1.8 | 1.5 | 0.3 | 100 |
| | | | | C | ICP | | | | | 1.06 | | | | | 1.07 | | 2.1 |
| on the market 3 | | 6.8 | 319 | A | EDX | 81.5 | 3.6 | 0.1 | 0.1 | 4.2 | | 0.4 | 4.1 | 2.4 | 3.3 | 0.4 | 100 |
| | | | | B | EDX | 74.7 | 4.6 | | | 2.5 | 10.7 | 0.1 | 2.5 | 2.1 | 2.3 | 0.4 | 100 |
| | | | | C | ICP | | | | | 1.47 | | | | | 1.14 | | 2.6 |

*acetone soluble component A: outer surface of glove B: inner surface of glove C: whole part of glove Example 6

Tensile test is carried out on a latex glove of mixture of acrylonitrile-butadiene to which methacrylic acid is added which is prepared by further adding methacrylic acid to acrylonitrilebutadiene to which previously mathacrylic acid is added or not added and a conventional glove of carboxylated nitrile latex prepared by conventional crosslinking method which uses sulfur and a vulcanizing accelerator along with ASTM-6319-00 testing method.

Each glove is hardened at 150° C. A glove to be tested is matured for 24 hours under condition of 50% humidity and 23° C. temperature. Regarding the glove, it is matured for 7 days under temperature condition of 70° C.

Results of physical properties measuring test of hardened and matured glove of the present invention are shown in Table 7. Regarding conventional glove is hardened at 150° C. A glove to be tested is matured for 24 hours under condition of 50% humidity and 23° C. temperature. Regarding the glove, it is matured for 7 days under temperature condition of 70° C. Results of physical properties of the glove are shown in Table 8.

TABLE 7

Physical properties of a glove of the present invention

| hardening temperature | 150° C. | 150° C. matured at 70° C. for 7 days |
|---|---|---|
| tension (MPa) | 26 | 34 |
| elongation (%) | 620 | 590 |
| elastic modulus 500% (MPa) | 9.8 | 12.6 |

TABLE 8

Physical properties of a conventional glove

| hardening temperature | 150° C. | 150° C. matured at 70° C. for 7 days |
|---|---|---|
| tension (MPa) | 26 | 26 |
| elongation (%) | 600 | 620 |
| elastic modulus 500% (MPa) | 12.3 | 10.6 |

Tension of the glove of the present invention is almost same as to that of conventional glove prepared by crosslinking method using ZnO (1.5 weight %) and sulfur (1.0 weight %). Regarding elongation, glove of the present invention is larger than that of conventional glove. Regarding the properties after matured, the glove of the present invention is better than that of conventional glove.

Composition of latex will be illustrated again. Regarding the latex composition of the mixture of acrylonitrilebutadiene to which methacrylic acid is added which is prepared by further adding methacrylic acid to acrylonitrilebutadiene to which previously mathacrylic acid is added or not added, adjust a pH from 9 to 10, and regulate contents of solid phase to be 18-30 weight % by water.

Gloves prepared using recipe of composition in Table 1 and by above mentioned process, is excellent in following points.

Advantage 1: Protect against I type hypersensitivity which causes immediately

Product prepared according to the present invention does not use natural rubber which causes I type hypersensitivity originated by presence of protein contained in latex.

Advantage 2: Protect against IV type hypersensitivity which causes delayed IV type hypersensitivity is caused by using a vulcanizing accelerator containing tiuram, dithiocarbamate and mercaptobenzothiazole. In the present invention, a vulcanizing accelerator which causes IV type hypersensitivity after used by delay is not used.

Advantage 3: Being excellent at physical and chemical properties.

The recipe of latex in Table 1 provides with latex system which has good film property.

Accordingly, the preparation of gloves of very thin film and having excellent barrier property can be possible. Size of gloves are shown below. It is clearly understood that the prepared gloves is thinner than conventional gloves (Table 9).

Physical properties are shown in Table 10. Tension at breaking and elongation of the gloves of the present invention are similar or higher than that of conventional gloves.

TABLE 9

| unit | thickness (wall of one layer) (mm) | | | length of glove (mm) |
|---|---|---|---|---|
| | thumb | palm | cuff | |
| 4.5 gm | 0.12-0.13 | 0.08-0.09 | 0.06-0.07 | 245-250 |
| 3.5 gm | 0.10-0.11 | 0.07-0.08 | 0.05-0.06 | 245-250 |

TABLE 10

| mass of glove | | 4.5 gm | 3.5 gm |
|---|---|---|---|
| tension (MPa) | just after the preparation | 20-35 | 20-35 |
| | 3 weeks after the preparation | 21-35 | 21-35 |
| elongation (%) | just after the preparation | 585-620 | 580-620 |
| | 3 weeks after the preparation | 585-620 | 580-620 |
| breaking strength | just after the preparation | 9.1-10.0 | 6.0-6.5 |
| | 3 weeks after the preparation | 9.0-9.8 | 5.8-6.2 |

Example 7

In Example 1, although sulfur as a crosslinking agent and vulcanizing accelerator are not used, Dermal sensitization study, which evaluates latent ability not to drag out immunocompatent against delayed IV type hypersensitivity caused when the product of the present invention is contacted with skin. Delayed IV type hypersensitivity is mainly caused by chemical compound such as accelerator used in conventional crosslinking method. In the method applied in this method, among CFR title 21, 50, 56 and 302 are adopted.

The purpose of this test is to determine change and/or susceptibility of human skin observed by repeating patch tests. The test is performed on 220 subjects (35 men and 185 women).

The test is carried out by two phases. Regarding test phase at introduction, a film specimen of glove of 1 inch square is placed on the surface of occlusive medical tape product of 3M. Patches are stuck on back between shoulder and waist. Tests are continued every Monday, Wednesday and Friday until 9 items of tests are performed. After 24 hours from sticking, all patches are removed. 24 hours rest is given on Tuesday and Thursday and after removal of patch on Saturday, 48 hours rest is given. Before next patch test, items returned by trained subjects are recorded.

After tests at introduction are over, device used for test is removed, and test is not carried out another 2 weeks. Re-challenge test is carried out after this 2 weeks rest. The re-challenge test is performed on new position. After removal, the position is observed and recorded at 24 hours and 72 hours. At the step when final observation is over, subjects are requested to report all variations and delayed variations caused on skin.

Variations caused on skin are recorded according to following standard (Table 11).

TABLE 11

| mark | opinion |
|---|---|
| 0 | no evidence to be affected |
| + | barely observed (minimum, slightly, not uniform, dotted erythema) |
| 1 | moderate (pink, un-uniform erythema covering almost whole part of contacted part) |
| 2 | medium (pink or red un-uniform erythema covering whole part of contacted part) |
| 3 | remarkable (bright red erythema accompanying or not accompanying petechiac or papule) |
| 4 | serious (deep red erythema accompanying vesiculation or defluxio of aqueous liquor) |

Testing results obtained from 220 subjects are summarized in Table 12. Any items do not mean illness. Several items (total 6 items) do not continue by end of test. Regarding glove prepared according to Example 1, there is no evidence to indicate disease of skin which becomes medical problem or allergic symptom caused by contact with human. This is resulted by meeting to latent care which indicates disease of skin of lower FDA.

TABLE 12

| | introduction step numbers of estimation | | | | | | | | | final step numbers of estimation | |
|---|---|---|---|---|---|---|---|---|---|---|---|
| | 1 | 2 | 3 | 4 | 5 | 6 | 7 | 8 | 9 | 24 hr | 72 hr |
| 0 | 220 | 220 | 220 | 220 | 220 | 218 | 216 | 216 | 216 | 214 | 214 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |

Example 8

Skin-Sensitize Test (Maximization Test)

This test is carried out by Juridical Foundation "Food and Medicine Safety Center" (Hatano-shi, Kanagawa) based on "Basic view about biological safety test necessary for petition of recognition of production (import) of medical device" (13 Feb. 2003, Consideration of Medicine No. 0213001" and "Reference materials regarding basic view of biological safety test" (19 Mar. 2003, Examination of medical device No. 36).

1. Analyte

Verte Kimax $7^{th}$ Sense (shortened: $7^{th}$ Sense, Materials: nitrile rubber, lot No. PB30061114103022) which is analyte is a gloves of blue color and provided by Midori Anzen Co., Ltd., and maintained in the place where evades irradiation of direct sunshine or high temperature under room temperature.

2. Product for Comparison

Verte 710N (shortened: 710N, Materials: nitrile rubber, lot No. 0104170) is a gloves of blue color and provided by Midori Anzen Co., Ltd., and maintained in the place where evades irradiation of direct sunshine or high temperature in room of 10-40° C. temperature.

3. Details of Experiment

Using methanol extraction of Verte Kimax 7th Sense, biological safety evaluation is obtained. And aiming to compare with Verte 710N, skin-sensitize test (maximization test) is carried out on a guinea pig using methanol extraction of Verte Kimax 7th Sense.

At the preparation of prescribing subject, methanol extract of Verte Kimax 7th Sense (hereinafter, shortened to 7th Sense-M) or methanol extract of Verte 710N (hereinafter, shortened to 710N-M) is suspended in ethanol by proportion of 1 mL to the extract obtained 1 g of analyte used for extraction, and 100 v/v % 7th Sense-M ethanol suspension and 100 v/v % 710N-M ethanol suspension are obtained. Further, BLANK obtained from methanol alone is poured into same amount of ethanol as used at the preparation of suspension of 7th Sense-M or 710N-M and 100 v/v % blank suspensions are prepared. In first skin-sensitize test, 100 v/v % 7th Sense-M ethanol suspension and 100 v/v % 710N-M ethanol suspension are replaced with same amount of olive oil, and 100 v/v % 7th Sense-M olive oil suspension and 100 v/v % 710N-M olive oil suspension are prepared. In second skin-sensitize test, 100 v/v % 7th Sense-M ethanol suspension and 100 v/v % 710N-M ethanol suspension are replaced with same amount of olive oil, and 100 v/v % 7th Sense-M olive oil suspension and 100 v/v % 710N-M olive oil suspension are prepared. In causing, 100 v/v % 7th Sense-M ethanol suspension and 100 v/v % 710N-M ethanol suspension are prepared by adding ethanol as stepwise. Further, 100 v/v % corresponding volume blank ethanol solution is used as is. In first skin-sensitize test (treatment first day) 10 v/v % 7th Sense-M olive oil suspension or 10 v/v % 710N-M olive oil suspension and Freund's complete adjuvant are injected by intradermal injection in upper part of shoulder bone of a guinea pig. At 7 days after treatment, 10 v/v % sodium lauryl sulfate is open spread on region including intradermal injection part, and next day (8 days after treatment) 100 v/v % 7th Sense-M olive oil suspension or 100 v/v % 710N-M olive oil suspension is blockage patched to same region as second skin-sensitize test for 48 hours. In causing (22 days after treatment), 100, 20, 4, 0.8, and 0.16 v/v % ethanol suspension of 7th Sense-M or 710N-M and 100 v/v % corresponding volume BLANK ethanol solution are blockage patched for 24 hours.

Conclusion of Experiment

Judgment is done according to judgment standard of Draize method after 24 hours and 48 hours from removal of patches. According to the results, positive reaction (erythema) is observed on 100 and 20 v/v % of 7th Sense-M prescribed group, and 100, 20, 4 and 0.8 v/v % of 710N-M prescribed group.

From above mentioned results, namely, 7th Sense-M and 710N-M indicate positive reaction, following conclusion is obtained. That is, under above mentioned test condition, Verte Kimax 7th Sense and Verte 710N-M indicate skin-sensitize against guinea pig, and minimum causing concentration is in case of Verte Kimax 7th Sense is 20 v/v % and in case of Verte 710N-M is 0.8 v/v % as the extracted solution.

In gloves of the present invention, Verte Kimax 7th Sense indicates positive reaction at high concentration of 20 v/v %, and Verte 710N-M indicates positive reaction at 0.8 v/v %.

For the purpose to obtain biological safety evaluation and to compare with Verte 710N-M, skin-sensitize test (maximization test) is carried out using methanol extract of Verte Kimax 7th Sense on a guinea pig.

Results are summarized in Tables.

Results by Weight of Individuals

TABLE 13A

| group | subject No. | starting date of previous test | first day | 8th day | 15th day | 22nd day | 25th day |
|---|---|---|---|---|---|---|---|
| I | 1-1 | 348 | 392 | 428 | 481 | 515 | 513 |
| 7th SenthM | 1-2 | 350 | 386 | 392 | 437 | 490 | 492 |
| | 1-3 | 361 | 401 | 459 | 499 | 534 | 535 |
| | 1-4 | 342 | 377 | 429 | 471 | 503 | 514 |
| | 1-5 | 383 | 446 | 502 | 555 | 601 | 595 |
| | 1-6 | 355 | 401 | 449 | 510 | 541 | 554 |
| | 1-7 | 332 | 367 | 402 | 448 | 462 | 466 |
| | 1-8 | 350 | 393 | 449 | 504 | 537 | 552 |
| | 1-9 | 348 | 378 | 435 | 461 | 498 | 518 |
| | 1-10 | 339 | 377 | 399 | 426 | 447 | 439 |
| | average | 351 | 392 | 434 | 479 | 513 | 518 |
| | standard deviation | ±14 | ±22 | ±33 | ±39 | ±44 | ±45 |
| II | II-1 | 372 | 403 | 438 | 470 | 500 | 485 |
| comparison | II-2 | 323 | 361 | 393 | 442 | 469 | 464 |
| (710N-M) | II-3 | 343 | 374 | 419 | 464 | 498 | 485 |
| | II-4 | 343 | 380 | 409 | 435 | 473 | 482 |
| | II-5 | 359 | 391 | 439 | 448 | 499 | 493 |
| | II-6 | 342 | 362 | 388 | 415 | 432 | 436 |
| | II-7 | 350 | 402 | 462 | 489 | 535 | 534 |
| | II-8 | 360 | 405 | 430 | 468 | 513 | 501 |
| | II-9 | 343 | 396 | 436 | 454 | 482 | 492 |
| | II-10 | 334 | 377 | 428 | 447 | 487 | 486 |
| | average | 347 | 385 | 424 | 453 | 489 | 486 |
| | standard deviation | ±14 | ±17 | ±23 | ±21 | ±28 | ±25 |

TABLE 13B

| group | subject No. | starting date of previous test | first day | 8th day | 15th day | 22nd day | 25th day |
|---|---|---|---|---|---|---|---|
| III | III-1 | 363 | 415 | 473 | 503 | 555 | 560 |
| negative | III-2 | 345 | 387 | 425 | 458 | 498 | 495 |
| comparison | III-3 | 382 | 443 | 472 | 495 | 539 | 529 |
| (BLANK) | III-4 | 354 | 401 | 442 | 481 | 525 | 541 |
| | III-5 | 333 | 368 | 390 | 407 | 443 | 438 |
| | average | 355 | 403 | 440 | 468 | 512 | 513 |
| | standard deviation | ±19 | ±28 | ±35 | ±39 | ±44 | ±48 |
| IV | IV-1 | 356 | 430 | 472 | 521 | 572 | 590 |
| positive | IV-2 | 333 | 375 | 420 | 426 | 485 | 481 |
| comparison | IV-3 | 354 | 396 | 444 | 470 | 521 | 533 |
| (DNCB) | IV-4 | 369 | 416 | 453 | 496 | 536 | 544 |
| | IV-5 | 344 | 395 | 440 | 485 | 529 | 541 |
| | average | 349 | 402 | 446 | 480 | 529 | 538 |
| | standard deviation | ±11 | ±21 | ±19 | ±35 | ±31 | ±39 |

DNCB: 1-chloro-2,4-dinitrobenzene

Results by Groups

TABLE 14

| group discrimination | sensitize substance | conc.(v/v %) 1st | conc.(v/v %) 2nd | causing substance | conc. (v/v %) | judge after removal of patch 24 hrs. positive ratio | 24 hrs. ave. eval. | 48 hrs. positive ratio | 48 hrs. ave. eval. |
|---|---|---|---|---|---|---|---|---|---|
| I 7th SenseM | 7th SenseM | 10 | 100 | 7th SenseM | 100 | 100 | 1.7 | 90 | 1.6 |
| | | | | | 20 | 80 | 0.9 | 80 | 0.9 |
| | | | | | 4 | 0 | 0.0 | 0 | 0.0 |
| | | | | | 0.8 | 0 | 0.0 | 0 | 0.0 |
| | | | | | 0.16 | 0 | 0.0 | 0 | 0.0 |
| | | | | blank | 0* | 0 | 0.0 | 0 | 0.0 |
| II comparison (710N-M) | 710N-M | 10 | 100 | 710N-M | 100 | 100 | 1.6 | 100 | 1.7 |
| | | | | | 20 | 100 | 1.4 | 90 | 1.4 |
| | | | | | 4 | 50 | 0.5 | 50 | 0.5 |
| | | | | | 0.8 | 20 | 0.2 | 20 | 0.2 |
| | | | | | 0.16 | 0 | 0.0 | 0 | 0.0 |
| | | | | blank | 0* | 0 | 0.0 | 0 | 0.0 |
| III negative comparison (BLANK) | blank | 10 | 100 | 7th SenseM | 100 | 40 | 0.4 | 40 | 0.4 |
| | | | | | 20 | 0 | 0.0 | 0 | 0.0 |
| | | | | | 4 | 0 | 0.0 | 0 | 0.0 |
| | | | | blank | 0* | 0 | 0.0 | 0 | 0.0 |
| | | | | 710N-M | 100 | 60 | 0.6 | 60 | 0.6 |
| | | | | | 20 | 0 | 0.0 | 0 | 0.0 |
| | | | | | 4 | 0 | 0.0 | 0 | 0.0 |
| IV positive comparison (DNCB) | DNCB w/v % | 0.1 | 0.1 | DNCB w/v % | 0.1 | 100 | 4.8 | 100 | 5.2 |
| | | | | | 0.01 | 100 | 3.8 | 100 | 4.0 |
| | | | | | — | 0 | 0.0 | 0 | 0.0 | positive ratio: Nos. of positive animals in group/Nos. of animals in group
ave. eval.: average of evaluation point: total of evaluation point of group/numbers of animals in group
DNCB: 1-chloro-2,4-dinitrobenzene
Medium (sensitize substance): olive oil (7th Sense-M, 710N-M, Blank, DNCB)
Medium (causing substance): ethanol (7th Sense-M, 710N-M, Blank, DNCB)
*100 v/v % corresponding volume BLANK ethanol solution Results after Patches are Removed

TABLE 15

| | | | causing substance | | | | | | | | | | |
|---|---|---|---|---|---|---|---|---|---|---|---|---|---|
| | | | 7th Sense-M | | | | | | | | | | blank |
| | | | 100 v/v % | | 20 v/v % | | 4 v/v % | | 0.8 v/v % | | 0.16 v/v % | | 100 v/v % |
| group | judge time | animal number | ① | ② | ① | ② | ① | ② | ① | ② | ① | ② | ① | ② |
| I 7th Sense-M | 24 hrs. | I-1 | 1 | 0 | 1 | 0 | 0 | 0 | 0 | 0 | 0 | 0 | 0 | 0 |
| | | I-2 | 2 | 0 | 1 | 0 | 0 | 0 | 0 | 0 | 0 | 0 | 0 | 0 |
| | | I-3 | 2 | 0 | 1 | 0 | 0 | 0 | 0 | 0 | 0 | 0 | 0 | 0 |
| | | I-4 | 1 | 0 | 1 | 0 | 0 | 0 | 0 | 0 | 0 | 0 | 0 | 0 |
| | | I-5 | 2 | 0 | 1 | 0 | 0 | 0 | 0 | 0 | 0 | 0 | 0 | 0 |
| | | I-6 | 2 | 0 | 1 | 0 | 0 | 0 | 0 | 0 | 0 | 0 | 0 | 0 |
| | | I-7 | 2 | 0 | 2 | 0 | 0 | 0 | 0 | 0 | 0 | 0 | 0 | 0 |
| | | I-8 | 1 | 0 | 0 | 0 | 0 | 0 | 0 | 0 | 0 | 0 | 0 | 0 |
| | | I-9 | 2 | 0 | 0 | 0 | 0 | 0 | 0 | 0 | 0 | 0 | 0 | 0 |
| | | I-10 | 2 | 0 | 1 | 0 | 0 | 0 | 0 | 0 | 0 | 0 | 0 | 0 |
| | | positive ratio | 100 | | 80 | | 0 | | 0 | | 0 | | 0 | |
| | | av. eval. | 1.7 | | 0.9 | | 0.0 | | 0.0 | | 0.0 | | 0.0 | |
| | 48 hrs. | I-1 | 1 | 0 | 1 | 0 | 0 | 0 | 0 | 0 | 0 | 0 | 0 | 0 |
| | | I-2 | 2 | 0 | 1 | 0 | 0 | 0 | 0 | 0 | 0 | 0 | 0 | 0 |
| | | I-3 | 2 | 0 | 1 | 0 | 0 | 0 | 0 | 0 | 0 | 0 | 0 | 0 |
| | | I-4 | 1 | 0 | 1 | 0 | 0 | 0 | 0 | 0 | 0 | 0 | 0 | 0 |
| | | I-5 | 2 | 0 | 1 | 0 | 0 | 0 | 0 | 0 | 0 | 0 | 0 | 0 |

TABLE 15-continued

| | ① | ② | ① | ② | ① | ② | ① | ② | ① | ② | ① | ② |
|---|---|---|---|---|---|---|---|---|---|---|---|---|
| I-6 | 2 | 0 | 1 | 0 | 0 | 0 | 0 | 0 | 0 | 0 | 0 | 0 |
| I-7 | 2 | 0 | 2 | 0 | 0 | 0 | 0 | 0 | 0 | 0 | 0 | 0 |
| I-8 | 0 | 0 | 0 | 0 | 0 | 0 | 0 | 0 | 0 | 0 | 0 | 0 |
| I-9 | 2 | 0 | 0 | 0 | 0 | 0 | 0 | 0 | 0 | 0 | 0 | 0 |
| I-10 | 2 | 0 | 1 | 0 | 0 | 0 | 0 | 0 | 0 | 0 | 0 | 0 |
| positive ratio | 90 | | 80 | | 0 | | 0 | | 0 | | 0 | |
| ave. eval. | 1.5 | | 0.9 | | 0.0 | | 0.0 | | 0.0 | | 0.0 | |

① erythema
② edema
Standard for judgment

| Forming of erythema and crust (erythema) | Evaluation point |
|---|---|
| Erythema is not observed | 0 |
| Very light erythema (barely ovserved) | 1 |
| Distinctive erythema | 2 |
| Medium or remarkable erythema | 3 |
| Small crust is formed from remarkable erythema | 4 |

| Forming of edema | Evaluation point |
|---|---|
| Not formed | 0 |
| Very light edema (barely observed) | 1 |
| Light edema (distinctive edge by clear torus) | 2 |
| Medium edema (torus of 1 mm around) | 3 |
| Remarkable (torus over than 1 mm and extension beyond exposure region) | 4 |

Positive ratio: (numbers of positive animal in group/numbers of animal in group) × 100
ave. eval.: averaged evaluated point: total of evaluated point of group/numbers of animal in group Results by Individuals after Removal of Patch

TABLE 16

| | | | causing substance | | | | | | | | | |
|---|---|---|---|---|---|---|---|---|---|---|---|---|
| | | | 710N-M | | | | | | | | blank | |
| | | | 100 v/v % | | 20 v/v % | | 4 v/v % | | 0.8 v/v % | | 0.16 v/v % | | 100 v/v % | |
| group | judge time | animal number | ① | ② | ① | ② | ① | ② | ① | ② | ① | ② | ① | 2 |
| II comparison 710N-M | 24 hrs. | II-1 | 2 | 0 | 2 | 0 | 0 | 0 | 0 | 0 | 0 | 0 | 0 | 0 |
| | | II-2 | 1 | 0 | 1 | 0 | 1 | 0 | 0 | 0 | 0 | 0 | 0 | 0 |
| | | II-3 | 2 | 0 | 1 | 0 | 1 | 0 | 1 | 0 | 0 | 0 | 0 | 0 |
| | | II-4 | 1 | 0 | 1 | 0 | 0 | 0 | 0 | 0 | 0 | 0 | 0 | 0 |
| | | II-5 | 2 | 0 | 2 | 0 | 1 | 0 | 0 | 0 | 0 | 0 | 0 | 0 |
| | | II-6 | 1 | 0 | 1 | 0 | 0 | 0 | 0 | 0 | 0 | 0 | 0 | 0 |
| | | II-7 | 2 | 0 | 2 | 0 | 1 | 0 | 1 | 0 | 0 | 0 | 0 | 0 |
| | | II-8 | 2 | 0 | 1 | 0 | 1 | 0 | 0 | 0 | 0 | 0 | 0 | 0 |
| | | II-9 | 2 | 0 | 2 | 0 | 0 | 0 | 0 | 0 | 0 | 0 | 0 | 0 |
| | | II-10 | 1 | 0 | 1 | 0 | 0 | 0 | 0 | 0 | 0 | 0 | 0 | 0 |
| | | positive ratio | 100 | | 100 | | 50 | | 20 | | 0 | | 0 | |
| | | ave. eval. | 1.6 | | 1.4 | | 0.5 | | 0.2 | | 0.0 | | 0.0 | |
| | 48 hrs. | II-1 | 2 | 0 | 2 | 0 | 0 | 0 | 0 | 0 | 0 | 0 | 0 | 0 |
| | | II-2 | 1 | 0 | 1 | 0 | 1 | 0 | 0 | 0 | 0 | 0 | 0 | 0 |
| | | II-3 | 2 | 0 | 2 | 0 | 1 | 0 | 1 | 0 | 0 | 0 | 0 | 0 |
| | | II-4 | 2 | 0 | 1 | 0 | 0 | 0 | 0 | 0 | 0 | 0 | 0 | 0 |
| | | II-5 | 2 | 0 | 2 | 0 | 1 | 0 | 0 | 0 | 0 | 0 | 0 | 0 |
| | | II-6 | 1 | 0 | 0 | 0 | 0 | 0 | 0 | 0 | 0 | 0 | 0 | 0 |
| | | II-7 | 2 | 0 | 2 | 0 | 1 | 0 | 1 | 0 | 0 | 0 | 0 | 0 |
| | | II-8 | 2 | 0 | 1 | 0 | 1 | 0 | 0 | 0 | 0 | 0 | 0 | 0 |
| | | II-9 | 2 | 0 | 2 | 0 | 0 | 0 | 0 | 0 | 0 | 0 | 0 | 0 |
| | | II-10 | 1 | 0 | 1 | 0 | 0 | 0 | 0 | 0 | 0 | 0 | 0 | 0 |
| | | positive ratio | 100 | | 90 | | 50 | | 20 | | 0 | | 0 | |
| | | ave. eval. | 1.7 | | 1.4 | | 0.5 | | 0.2 | | 0.0 | | 0.0 | |

① erythema
② edema

Results by Individuals after Removal of Patch (2)

TABLE 17

| | | | causing substance | | | | | | | | | | | | | |
|---|---|---|---|---|---|---|---|---|---|---|---|---|---|---|---|---|
| | | | 7th Sense-M | | | | | | blank | | 710N-M | | | | | |
| | | | 100 v/v % | | 20 v/v % | | 4 v/v % | | 100 v/v % | | 100 v/v % | | 20 v/v % | | 4 v/v % | |
| | judge | animal | | | | | | | | | | | | | | |
| group | time | number | ① | ② | ① | ② | ① | ② | ① | ② | ① | ② | ① | ② | ① | ② |
| III negative comparison (blank) | 24 hrs. | III-1 | 0 | 0 | 0 | 0 | 0 | 0 | 0 | 0 | 0 | 0 | 0 | 0 | 0 | 0 |
| | | III-2 | 0 | 0 | 0 | 0 | 0 | 0 | 0 | 0 | 1 | 0 | 0 | 0 | 0 | 0 |
| | | III-3 | 1 | 0 | 0 | 0 | 0 | 0 | 0 | 0 | 1 | 0 | 0 | 0 | 0 | 0 |
| | | III-4 | 1 | 0 | 0 | 0 | 0 | 0 | 0 | 0 | 0 | 0 | 0 | 0 | 0 | 0 |
| | | III-5 | 0 | 0 | 0 | 0 | 0 | 0 | 0 | 0 | 1 | 0 | 0 | 0 | 0 | 0 |
| | | positive ratio | 40 | | 0 | | 0 | | 0 | | 60 | | 0 | | 0 | |
| | | average eval. | 0.4 | | 0.0 | | 0.0 | | 0.0 | | 0.6 | | 0.0 | | 0.0 | |
| | 48 hrs. | III-1 | 0 | 0 | 0 | 0 | 0 | 0 | 0 | 0 | 0 | 0 | 0 | 0 | 0 | 0 |
| | | III-2 | 0 | 0 | 0 | 0 | 0 | 0 | 0 | 0 | 1 | 0 | 0 | 0 | 0 | 0 |
| | | III-3 | 1 | 0 | 0 | 0 | 0 | 0 | 0 | 0 | 1 | 0 | 0 | 0 | 0 | 0 |
| | | III-4 | 1 | 0 | 0 | 0 | 0 | 0 | 0 | 0 | 0 | 0 | 0 | 0 | 0 | 0 |
| | | III-5 | 0 | 0 | 0 | 0 | 0 | 0 | 0 | 0 | 1 | 0 | 0 | 0 | 0 | 0 |
| | | positive ratio | 40 | | 0 | | 0 | | 0 | | 60 | | 0 | | 0 | |
| | | average eval. | 0.4 | | 0.0 | | 0.0 | | 0.0 | | 0.6 | | 0.0 | | 0.0 | |

① erythema
② edema

Results by individuals after removal of patch (3)

TABLE 18

| | | | causing substance | | | | | |
|---|---|---|---|---|---|---|---|---|
| | judge | animal | 0.1 w/v % DNCB | | 0.01 w/v % DNCB | | ethanol | |
| group | time | number | ① | ② | ① | ② | ① | ② |
| IV positive comparison (DNCB) | 24 hrs. | IV-1 | 4 | 1 | 3 | 0 | 0 | 0 |
| | | IV-2 | 3 | 1 | 3 | 1 | 0 | 0 |
| | | IV-3 | 4 | 1 | 3 | 1 | 0 | 0 |
| | | IV-4 | 4 | 1 | 3 | 0 | 0 | 0 |
| | | IV-5 | 4 | 1 | 4 | 1 | 0 | 0 |
| | | positive ratio | 100 | | 100 | | 0 | |
| | | average eval. | 4.8 | | 3.8 | | 0.0 | |
| | 48 hrs. | IV-1 | 4 | 2 | 3 | 0 | 0 | 0 |
| | | IV-2 | 4 | 1 | 4 | 1 | 0 | 0 |
| | | IV-3 | 4 | 1 | 3 | 1 | 0 | 0 |
| | | IV-4 | 4 | 1 | 3 | 0 | 0 | 0 |
| | | IV-5 | 4 | 1 | 4 | 1 | 0 | 0 |
| | | positive ratio | 100 | | 100 | | 0 | |
| | | average eval. | 5.2 | | 4.0 | | 0.0 | |

① erythema
② edema

Example 9

Storage elastic modulus E', loss elastic modulus E" and loss tangent tan δ, which are dynamic viscoelasticity properties of specimens of the glove of the present invention and VERTE 710, which is conventional product, are measured by a viscoelastometer under tensile mode. Results are shown in Table 11. Master curve of dynamic viscoelasticity is calculated and shown in FIG. 5 and FIG. 6.

When compared with conventional product, the gloves of the present invention indicates good results.

Figure 5:
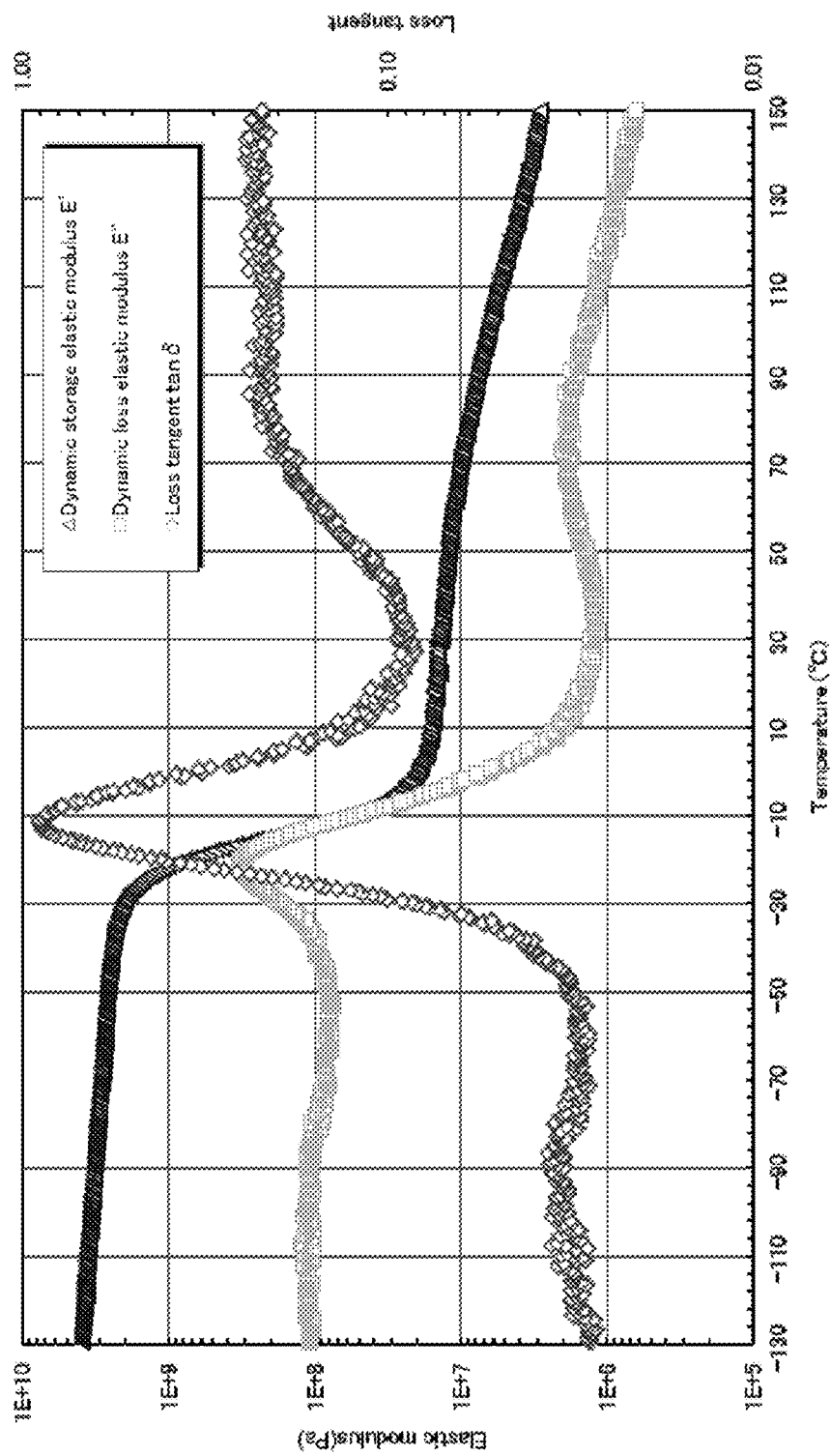
FIG. 5 is a drawing which shows master curve calculation results of dynamic viscoelasticity from measuring results of storage elastic modulus E', loss elastic modulus E" and loss tangent tan δ, which are dynamic viscoelasticity properties, measured by tensile mode of specimen of gloves (emulsion film prepared by casting emulsion aqueous solution and vacuum dried for 72 hours at 40° C. is used).

From the results of storage elastic modulus E', loss elastic modulus E" and loss tangent tan δ, which are dynamic viscoelasticity properties of specimens of the glove of the present invention and VERTE 710, which is a conventional product, measured by a viscoelastometer under tensile mode, master curve of dynamic viscoelasticity is calculated and shown in FIG. 5. This curve indicate the results of the gloves of the present invention. In the case of the present invention, storage elastic modulus E', loss elastic modulus E" and loss tangent tan δ measured under tensile mode are good.

Example 10

Analytical Results of Emulsion Material

746SXL of the present invention, conventional product 6322 and conventional product Nipol 550, which are emulsion material are heated and dried under vacuum condition at 80° C. for 8 hours and resin residue are weighted and solid parts in latex are calculated.

(1) NBR rubber solid component in each emulsion materials, when water part is removed under vacuum condition at 80° C., are 45-46% around.

(2) Analytical results of elements (C, H) in solid part of each latex specimen are almost same (C: 78-79%, H, 9.8-10.0 weight %. Nitrogen contents of Nipol 550 (originated from acrylonitrile) is relatively about 3% lower than other specimens by acryronitrile standard, however, every specimens are in the range of nitrile (amount of AN is 25-30%). In the meanwhile, amount of S originated from surfactant are 0.3-0.5 weight %.

Figure 3:
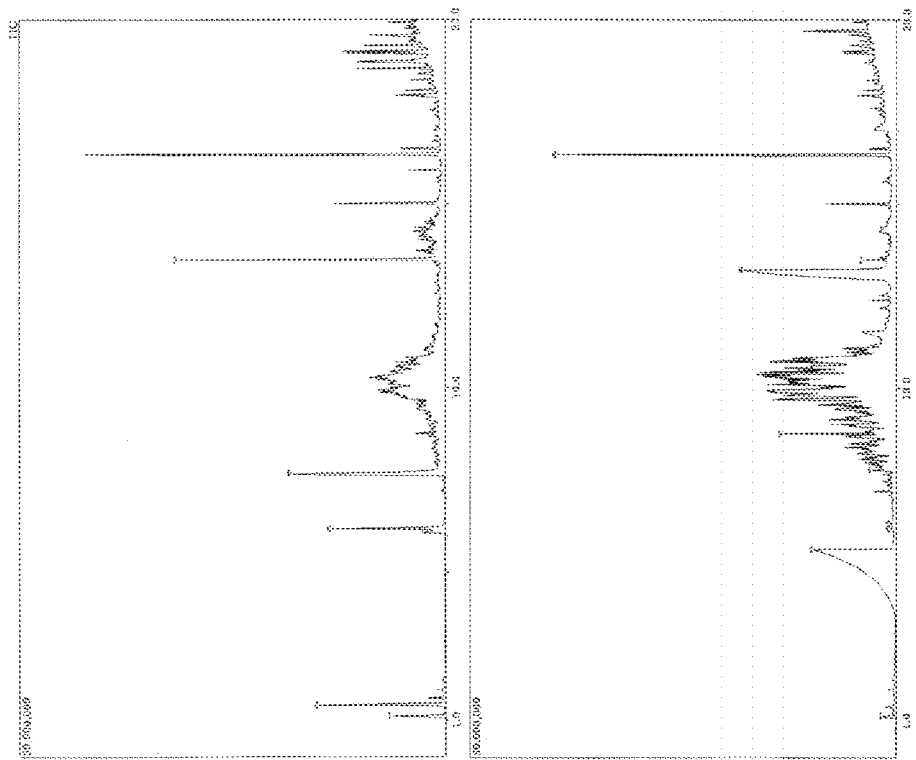

(3) Amount of volatile untreated MMA monomer in 6322 is 13 ppm (upper drawing of FIG. 3 is a drawing showing amount of volatile untreated MMA monomer in conventional product). Amount of volatile untreated MMA monomer in 746 SXL of the present invention is 370 ppm (lower drawing of FIG. 3 is a drawing showing amount of volatile untreated MMA monomer in the present invention).

Example 11

Measuring Method of Mooney Viscosity

Mooney viscosity ($ML_{(1+4)}(100°\ C.)$) of an elastomer which is first step crosslink is over by adding methacrylic acid to acrylonitrile-butadiene by further adding methacrylic acid to acrylonitrile-butadiene to which previously mathacrylic acid is added or not added is 100-220.

Measuring method of Mooney viscosity is regulated by JISK6300 and ASTM D1646.

Mooney viscosity is viscosity of rubber measured by Mooney plasticity meter (viscometer), graduation of meter is cut by Mooney unit and directly indicates Mooney viscosity. In general, a large rotor is used at 100° C., after 1 minute of previous heating, and the rotor is started to rotate and a value after 4 minutes is observed and indicated by ($ML_{(1+4)}(100°\ C.)$).

(a) At the measurement of Mooney viscosity, acrylonitrile-butadiene and methacrylic acid are added to 200 ml of mixed saturated aqueous solution of calcium nitrate and calcium carbonate. Unsaturated carboxylic acid (or mathacrylic acid) is reacted to butadiene part of acrylonitrile-butadiene and butadiene part of other acrylonitrile-butadiene. Latex, in which unsaturated carboxylic acid (or mathacrylic acid) is added to butadiene part so as to form a state having many branches, or forming a state that a part of unsaturated carboxylic acid (or mathacrylic acid) is added to butadiene part so as to form graft polymerization, is dropped by a pipette, stirred for 10 minutes (at 23° C., stirring speed is 500 rpm), then deposition of solid rubber is confirmed.

The obtained solid rubber is took out and washed by stirring with 1000 ml of ID water (at 23° C., stirring speed is 500 rpm). This washing operation is repeated 10 times.

This washed solid rubber is dehydrated by squeezing, further dried by vacuum at 60° C. for 72 hours.

In this state, a glove former mentioned below is dipped in a coagulant, coated, dried or partially dried at the temperature of 50-70° C. range, then dipped into latex prepared by recipe of the present invention. The glove former is dipped into the latex during specific time so as to coat the latex certainly on the surface of the glove former and is in the state of before drying. Mooney viscosity of the latex of not crosslinked state may be measured.

It is necessary to pay attention not to make the thickness of the glove becomes too thick. Dipping time of the glove former in latex is decided according to contents of total solid compound (TSC) of latex and desired thickness for coating. The dipping time is 1-20 seconds, desirably, from 12 to 17 seconds.

Under above mentioned condition, Mooney viscosity of not crosslinked elastomer which is a polymer consisting of a mixture prepared by adding methacrylic acid to acrylonitrile-butadiene by further adding methacrylic acid to acrylonitrile-butadiene to which previously mathacrylic acid is added or not added is measured.

(b) Based on JIS K6300-1: 2001 (non-vulcanized rubber-physical property-first clause: Viscosity by Mooney viscometer and a method to decide scorching time), dried solid rubber part recovered from each latex is passed through between 8 inches rollers of 1.00 mm distance for 10 times and a specimen for test is prepared.

(c) Mooney viscosity ($ML_{(1+4)}(100°\ C.)$) of 746SXL of the present invention is 151, while, that of conventional 6322 is 122. According to previous measurement, they were respectively 180 and 128.

In general, NBR (acrylonitrile-butadiene) latex is a polymer characterized by partially co-polymerizing unsaturated carboxylic acid such as methacrylic acid.

Polymerization degree of said polymer can be measured by various methods, however, in a case not to be solved in organic solvent, Mooney viscosity becomes effective index. Since NBR (acrylonitrile-butadiene) latex to be used in the present invention can bond by covalent bond with 2 double bonds of butadiene by sulfur, the latex can perform a rubber elastomer characterized that the NBR (acrylonitrile-butadiene) latex is highly crosslinked. Further, zinc acts as bivalent metallic ion and crosslinks two unsaturated carboxylic acid and crosslink structure becomes stronger. However, in the present invention, since there is no crosslink structure by sulfur, intensity of rubber elastomer is supported by making molecular weight (degree of polymerization) of NBR latex higher, enmeshing or invading of NBR latex each other. Mooney viscosity of conventional NBR latex is about from 30 to 80, on the contrary, that of the present invention is from 100 to 220 and polymerization degree is higher than that of the conventional product.

Accordingly, when molecules of NBR latex of higher polymerization degree enmesh or invade each other, said phenomenon contributes largely to intensity. And, between NBR latexes which enmesh or invade each other, when partially copolymerized unsaturated carboxylic acid is crosslinked by zinc, which is bivalent metallic ion, intensity of it becomes stronger.

In a case of NBR latex whose Mooney viscosity is smaller than 100, since length of molecule is short, effect of enmeshing or invading is small. When Mooney viscosity becomes larger than 220, molecule of NBR latex enmeshes by itself and engraving with other molecule of NBR latex becomes small, further degree of mutual invading of NBR latex becomes small. Further, regarding crosslink by zinc, probability to cause between unsaturated carboxylic acid in same NBR latex polymer becomes high, and phenomenon to crosslink plural NBR latex by zinc becomes small, therefore intensity is deteriorated and becomes to be easily cut.

From various experiments of the inventors, optimum value range of Mooney viscosity is from 100 to 220.

Example 12

Measuring Method for Particle Size Distribution

Each latex solution is diluted to 0.02% around by DI water and dispersed by ultra sonic for 1 minutes, then particle size distribution is measured by following sub micron particle size measuring apparatus.

(condition for measurement of particle size)
Measuring apparatus: COULTER N4 PLUS
Liquid viscosity: 0.9333 cp
Temperature: 23° C.
Automatic SDP: 10 nm-1000 m
Angle selected: 90°

Figure 4:
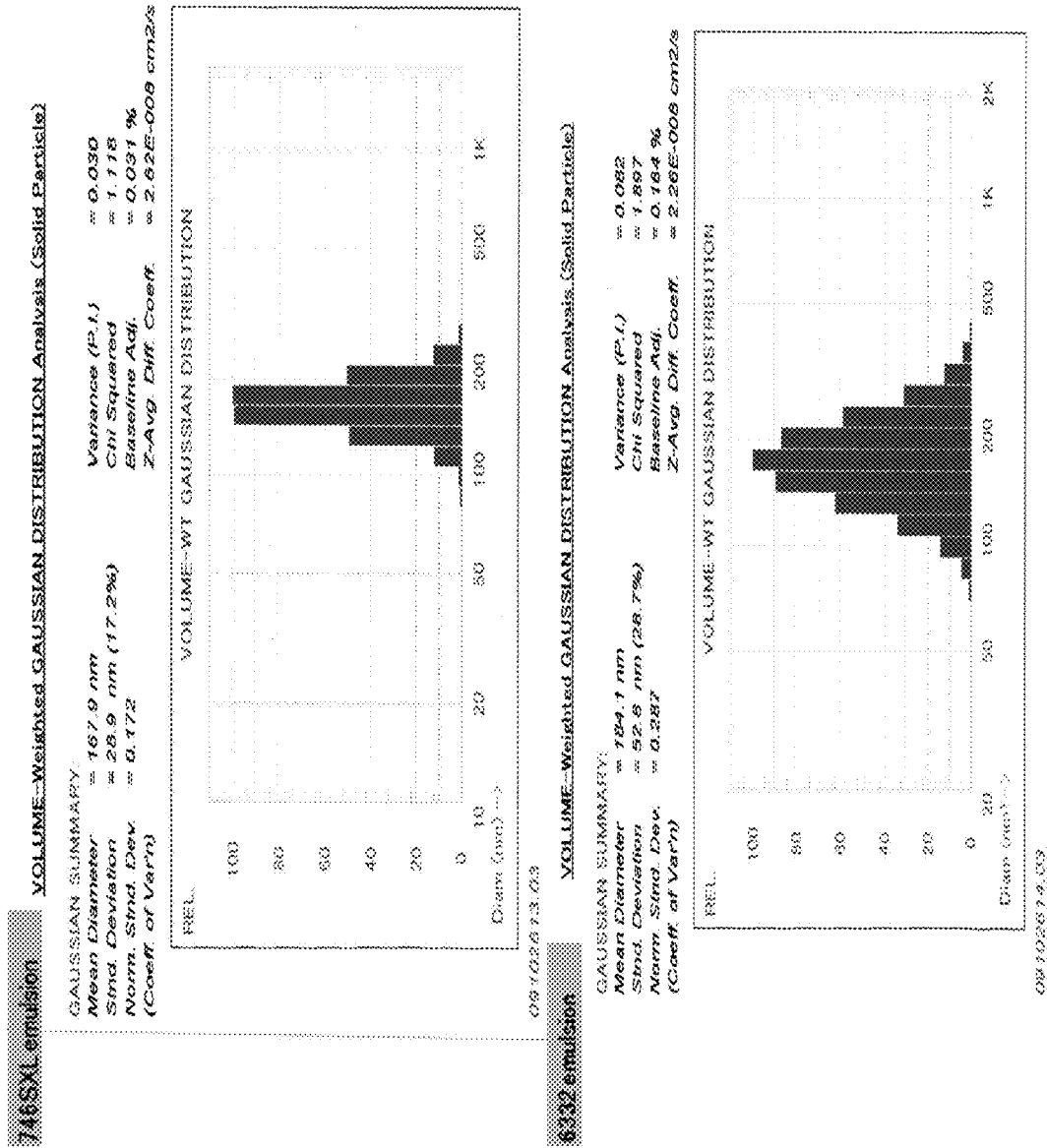

Previously measured particle size of 746 SXL latex of the present invention is, average particle size=168 nm, standard deviation is 28.9 nm (upper drawing of FIG. 4).

Particle size of 746 SXL latex of the present invention measured this time, average particle size=170 nm, standard deviation is 16 nm.

Previously measured particle size of 6322 latex, which is conventional product, is, average particle size=178 nm, standard deviation is 30.0 nm (lower drawing of FIG. 4). Particle size of 6322 latex, which is conventional product, measured this time is, average particle size=184 nm, standard deviation is 53 nm.

Particle size distribution of Nipol 550, which is conventional product, measured this time, average particle size=141 nm, standard deviation is 24 nm.

Example 13

Analysis of Reactivity Evaluation of Latex Materials (a) Test Method for Trial Preparation of Latex Containing ZnO After adding zinc oxide (ZnO) solution to each latex so as the amount of ZnO to solid part of latex to be 1.2 weight part converted to solid part, stirred in a sealing vessel at room temperature for 24 hours, then transferred to a glass vessel having flat bottom (height of liquid surface is 2 mm) and dried at 40° C. so as to obtain a film, then heat treated by prescribed temperature (150° C.) for 1 hour.

(b) Test Method for Trial Preparation of Latex not Containing ZnO

Each latex is transferred to a glass vessel having flat bottom (height of liquid surface is 2 mm) and dried at 40° C., then heat treated by prescribed temperature (150° C.) for 1 hour.

(c) Method for Quantitative Analysis of Carboxylic Acid

Amount of un-reacted carboxyl acid in latex solid part (resin film) is quantitatively analyzed as follows. Ratio of absorption peak intensity of carboxylic group originated to MMA and absorption peak intensity originated to acrylonitrile group, namely, "peak intensity of COOH group at 1699 $cm^{-1}$/peak intensity of CN group at 2235 $cm^{-1}$" of each latex solid part (resin film) obtained by dry treatment is measured using Infra Red spectrum and amount of un-reacted carboxyl acid in solid part (converted to 0) is calculated using calibration curve (prepared from resin film prepared by adding 1-3% polyacrylic acid (PAA) based on solid part to 746 SXL latex).

(d) Analysis of Light Component (Un-Reacted NBR)

Amount of light component (un-reacted ratio, non vulcanized NBR) in latex materials film: Extracted by Soxhlet extraction using acetone solvent and measured based on JIS K6229 (method for quantitative analysis of rubber-extracted product).

(e) Measuring Method of Weight Swelling Ratio

Swelling test of latex materials film is carried out by dipping a film in toluene solvent at room temperature and weight increase (in general, as a method to evaluate vulcanization state simply, following method is used. That is, when vulcanized rubber is dipped into good solvent, the good solvent acts to dissolve and expand polymer chain, but in a case of crosslinked polymer e.g. vulcanized rubber, it is suppressed by elasticity of network and reaches to swelling equilibrium state, and vulcanization density of vulcanized rubber is in reverse proportional relationship with equilibrium swelling ratio) after 72 hours is measured, and the weight swelling ratio of latex materials film is calculated. The weight swelling ratio indicates a crosslinking state of vulcanized rubber.

Above mentioned analysis results are summarized in Tables 19 and 20. Table 19 shows results about 40° C. dried specimens, and Table 20 shows results about 1 hour heat treated specimens at 150° C.

TABLE 19

| 40° C. dried | | 746 SXL | | 6322 | | Nipol 550 | |
|---|---|---|---|---|---|---|---|
| | | 746 SXL | 746 SXL + ZnO | 6322 | 6322 + ZnO | 550 | 550 + ZnO |
| carboxylic acid | Lot 1 | 4.07 | — | 4.01 | — | 3.76 | — |
| (wt. %) | Lot 2 | 4.15 | — | 4.36 | — | 3.73 | — |
| | ave. | 4.1 | — | 4.2 | — | 3.7 | — |
| acetone soluble | Lot 1 | 33.7 | 32.4 | 32.6 | 31.8 | 89.9 | 98.7 |
| component (wt. %) | Lot 2 | 27.4 | — | 33.2 | — | — | — |
| weight swelling | Lot 1 | 287 | 275 | 293 | 281 | 501 | 529 |
| ratio (%) | Lot 2 | 338 | — | 345 | — | — | — | adding amount of ZnO: 1.2 weight parts as solid parts

TABLE 20

| 1 hour heat treated at 150° C. | | 746 SXL | | 6322 | | Nipol 550 | |
|---|---|---|---|---|---|---|---|
| | | 746 SXL | 746 SXL + ZnO | 6322 | 6322 + ZnO | 550 | 550 + ZnO |
| carboxylic acid | Lot 1 | 5.07 | 0.41 | 4.17 | 0.24 | 3.29 | 0.0 |
| (wt. %) | Lot 2 | 4.54 | 0.22 | 4.33 | 0.19 | 3.01 | 0.0 |
| | ave. | 4.8 | 0.4 | 4.3 | 0.2 | 3.2 | 0.0 |
| acetone soluble | Lot 1 | 26.9 | 14.2 | 22.8 | 7.6 | 52.1 | 47.7 |
| component (wt. %) | Lot 2 | — | 13.4 | — | 13.8 | — | — |
| weight swelling | Lot 1 | 256 | 222 | 251 | 232 | 562 | 539 |
| ratio (%) | Lot 2 | — | 261 | — | 270 | — | — |
| reacting ratio (%) | Lot 1 | 0.0 | 92 | 0.0 | 95 | 14 | 100 |
| | | (−17%) | | (−2%) | | | |
| | Lot 2 | 0.0 | 93 | 8 | 84 | — | — |

1) adding amount of ZnO: 1.2 weight parts as solid parts
2) reacting ratio (%) = 100 × (40° C. dried product amount of carboxylic acid (wt %) − 1 hour heat treated at 150° C. amount of carboxylic acid (wt %)/40° C. dried product amount of carboxylic acid (wt %)
In 746 SXL of the present invention and 6322 which is conventional product, decrease of amount of carboxylic acid by heat drying is not observed when ZnO is not present. In case of Nipol 550, 10-20% of decrease of amount of carboxylic acid is observed.

As the next, when ZnO is added to 746 SXL of the present invention and 6322 which is conventional product, remarkable decrease of amount of carboxylic acid by heat treatment at 150° C. is observed, and tendency of the decrease (increase of reacting ratio) is more remarkable in 746 SXL. It is understand that crosslink is accelerated.

Amount of acetone soluble component (un-reacted NBR rubber) of 746 SXL in ZnO not added series of two lots are 33.7 weight % and 27.4 weight %, and in lot 1, decreased to 26.9% by one hour heat treatment at 150° C. On the contrary, in ZnO added series, amount of carboxylic acid group decreases remarkably from 32.4% to 14.2% by one hour heat treatment at 150° C. and crosslinking effect by zinc is observed.

Weight swelling ratio of 40° C. dried 746 SXL of ZnO non added series by two lots measuring results are 287% and 336% and indicates that the crosslinking density is relatively high. In a case of ZnO added series, same tendency is indicated.

Amount of acetone soluble component and weight swelling ratio of 6322 are almost same level as to those of 746 SXL.

In the case of Nipol 550, results are different from above mentioned cases. In 40° C. dried case, weight swelling ratio of ZnO not added series is 501% and ZnO added series is 529%, namely, both case are relatively high, and in one hour heat treatment at 150° C., weight swelling ratio is increased even if ZnO is added. These results indicate that in case of Nipol 550, film of high crosslinking density cannot be obtained without crosslinking treatment, further, crosslinking density cannot be increased by adding of ZnO. Mooney viscosity ($ML_{(1+4)}(100°$ C.$)$) of 746 SXL is large as 151 and 181 by two lots measurement, on the contrary in the case of Nipol 550 is small as 94, therefore, in case of Nipol 550 it is considered that effect of enmeshing or mutual invading are becoming small because molecular chain is small.

Example 14

Figure 12:
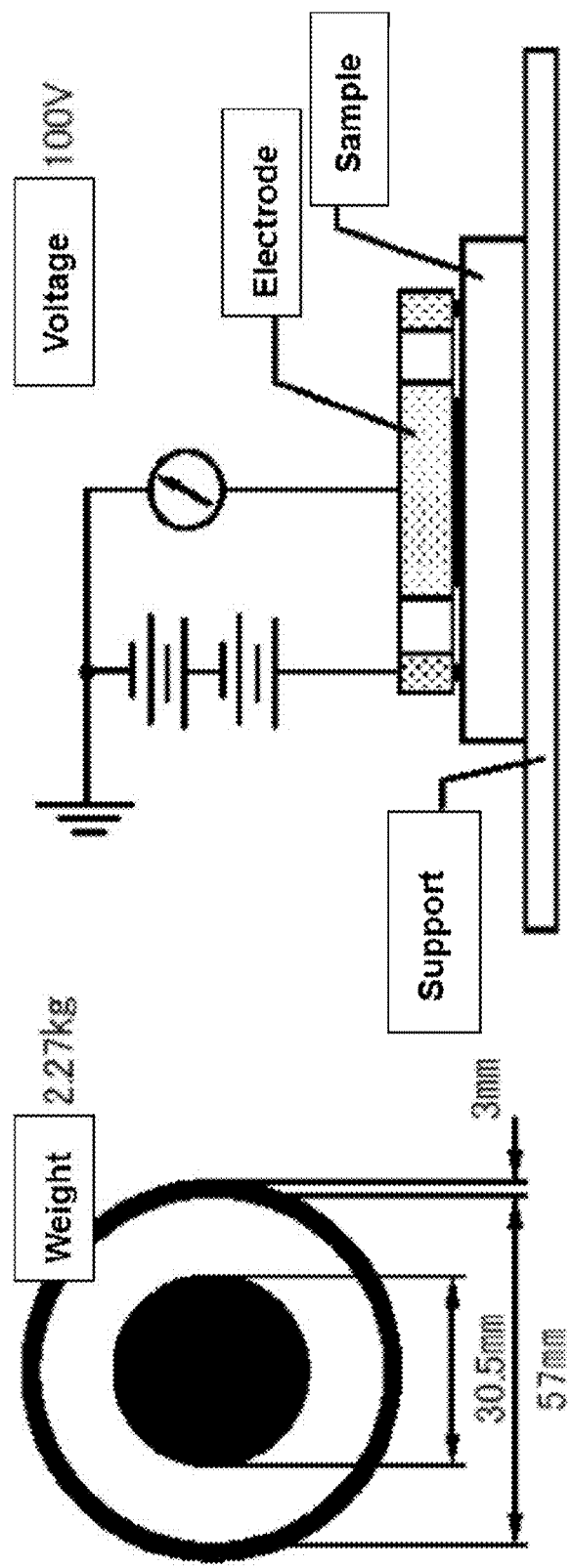
FIG. 12 shows a measuring apparatus of surface resistance ratio of gloves.
Figure 13:
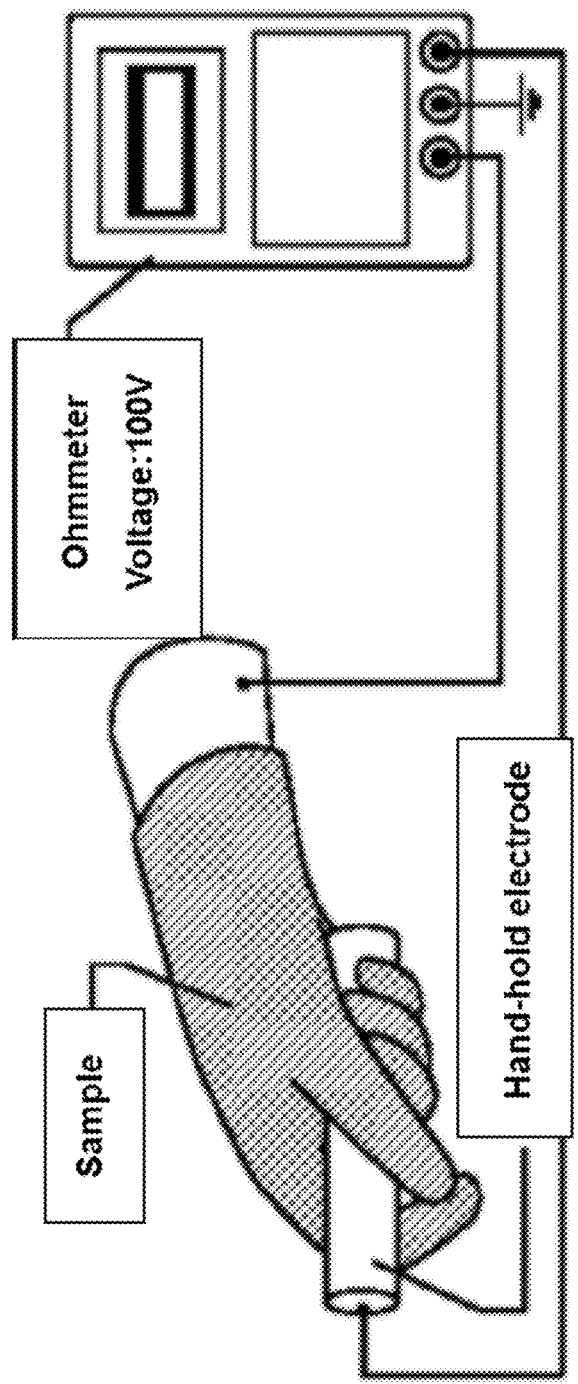
Figure 14:
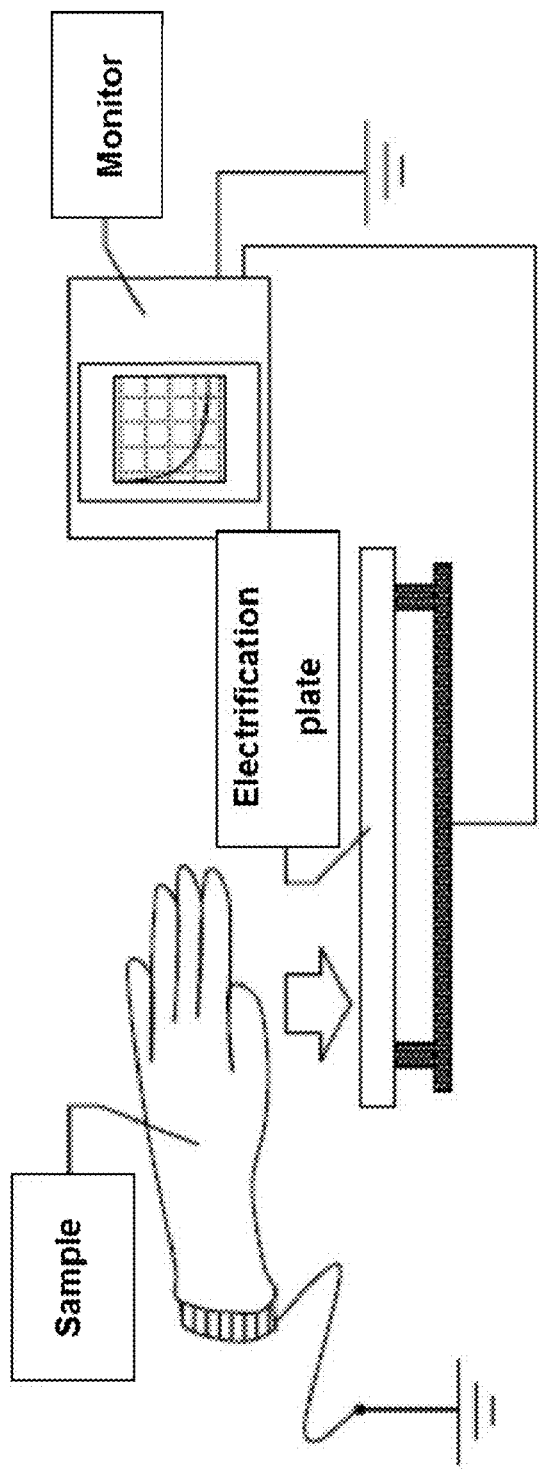
FIG. 14 shows a measuring apparatus of decay of charge.

Electric Properties of the Glove of the Present Invention are Measured (a) Surface Resistivity
Measuring method is mentioned as follows. Measuring apparatus is shown in FIG. 12.
Based on IEC standard 61340-2-1A. 5.4.
Environment for measurement: 20° C., 40% RH
Testing apparatus: Surface resistance meter MODEL 152 (product of Treck)
Charged electric voltage: 100 v
Measuring result is $2.65 \times 10^{12}$ Ω/sq.
(b) Resistance at Gloves Wearing
Measuring method is mentioned below. Measuring apparatus is shown in FIG. 13.
Based on IEC standard 61340-2-1A.5.4.
Environment for measurement: 20° C., 40% RH
Testing apparatus: Surface resistance meter MODEL 152 (product of Treck)
Charged electric voltage: 100 v
Normalized value: $7.5 \times 10^5 \leq Rg \leq 1 \times 10^{12}$
Measuring result is $1.22 \times 10^8$ Ω.
(c) Measurement of Charge Decay
Method for measurement is mentioned below. Measuring apparatus is shown in FIG. 14.
Based on ICE standard 61340-2-1 Appendix A, A2.2.
Environment for measurement: 20° C., 40% RH
Used apparatus: Charged plate monitor MODEL 158 charge (product of Treck)
Normalized value: less than 2 seconds
A hand of monitor wearing the gloves which is set up by list strap on a plate which is charged to ±1000 v, and measure the time until the plate decays to ±100 v. According to the results, the time necessary to decay from 1000 v to 100 v is 0.48 seconds by − polarity and 0.35 seconds by + polarity.

As mentioned above, the gloves of the present invention indicates good electric properties.

Example 15

SEM/EDX analytical results of outer surface of rubber gloves are as follows.

Morphological analysis of particle shape adhesion on outer surface of third finger part of rubber glove specimens are analyzed by an electronic microscope (ES-SEM, 30-5000 magnification), further, element analysis of it is carried out using an energy dispersive X-ray analyzer (EDX) attached to the electronic microscope.

Condition for measurement of FE-SEM/EDX
    Apparatus: Hitachi S-4100 type
    Condition for measurement:
    accelerating voltage; 15 kv, Pt—Pd vapor deposition treatment; 30 secs.
    EDX measuring condition:
    Product of KEVEX Quantum detector (measuring element B-U, resolution is 143 eV)

Figure 6:
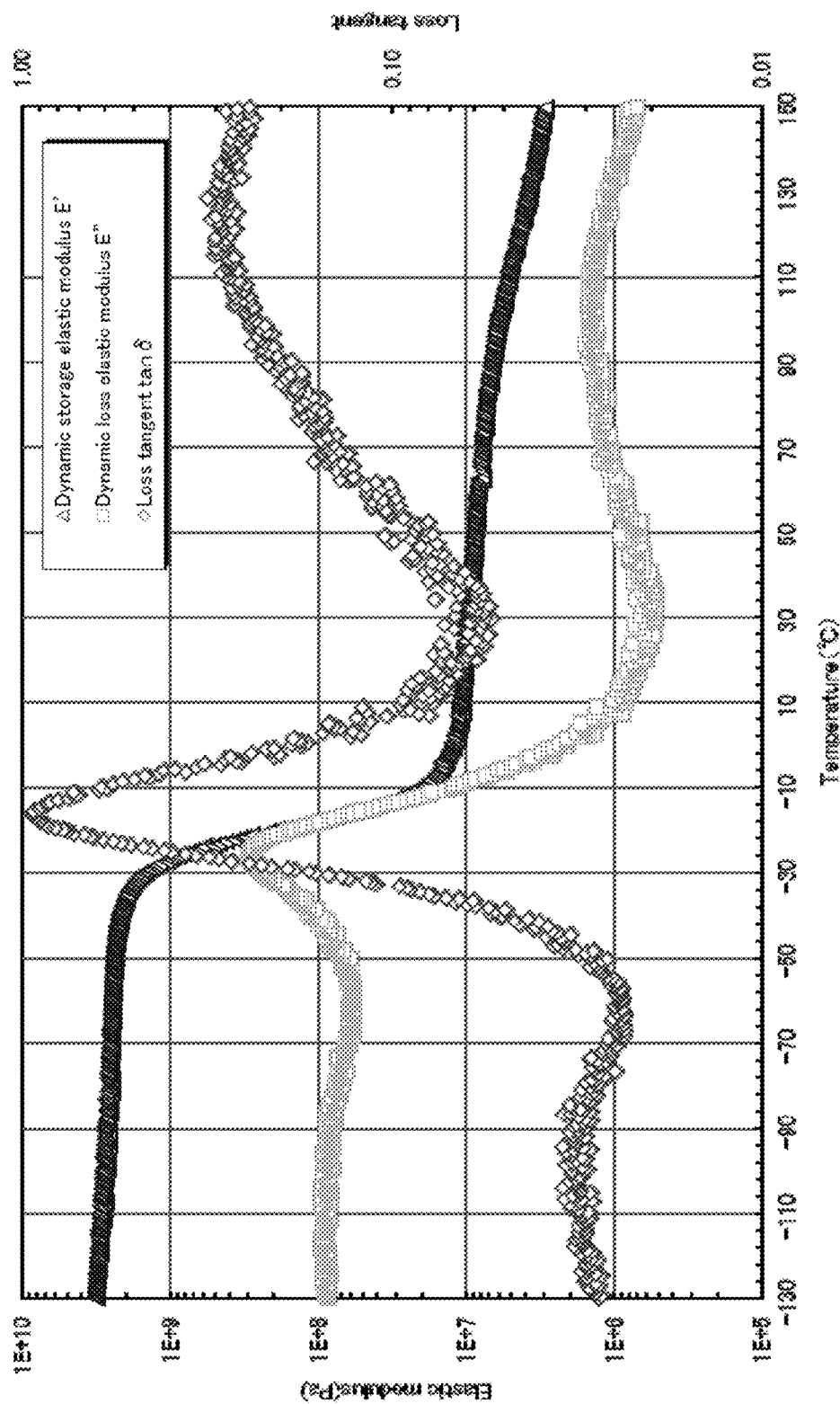
FIG. 6 is a drawing which shows master curve calculation results of dynamic viscoelasticity from measuring results of storage elastic modulus E', loss elastic modulus E" and loss tangent tan δ, which are dynamic viscoelasticity properties, measured by tensile mode of specimen of gloves of conventional VERTE710 (same as FIG. 5).

A of FIG. 6 is a drawing showing outer surface of third finger part of glove of the present invention and indicating existence of elements on the outer surface of third finger part of glove of the present invention. B is a drawing showing outer surface of third finger part of glove of a conventional glove and indicating existence of elements on the outer surface of third finger part of the conventional glove.

It is clearly understood that the numbers of element existing in the glove of the present invention is reduced by chlorine treatment.

Measuring results are shown below.

Regarding powder existing on the surface of third finger part of glove, analytical results of outer surface and inner surface of the glove of the present invention and conventional glove by EDX are mentioned in Table 6 of previously mentioned Example 5. Amount of acetone soluble element and weight swelling ratio is indicated together with.

Example 16

Measuring results of the product is shown below. Chlorinization of outer surface of the glove is carried out by chlorine concentration of 50-150 ppm. It is understood that the average value of the particle size of the present invention is low, further tensile strength and amount of eluted metal and chlorine are also low. That is, the product of the present invention is a good product. The obtained rubber glove from which metallic ions are removed by chlorine treatment is placed into water for one hour and main contamination components (Na, K, Ca, Zn and Cl) are extracted (5 cm from cuff is out of analysis object).

Extracted solution is took off in a clean room and analyzed by ICP-MS and an ion chromatography (IC) which are set up in the clean room. Results are shown in Table 12.

Numbers of particle of over than 0.3 μm is two by average. Others is over than three. Results are shown in Table 21.

TABLE 21

| specimen | Cl treatment concentration ppm | Cl treatment time min | Nos. of particle Φ 0.3 μm ≥ average | tensile strength MPa | elongation % | amount of elution (μg) Na | K | Ca | Zn | Cl |
|---|---|---|---|---|---|---|---|---|---|---|
| present invention 1 | 150 | 10 | 11 | 31 | 530 | 1.2 | 1.7 | 3.3 | 1.6 | 3.0 |
| present invention 2 | 70 | 15 | 3 | 28 | 550 | 1.3 | 2.6 | 2.6 | 1.6 | 4.6 |
| present invention 3 | 50 | 20 | 0 | 28 | 550 | 1.1 | 2.1 | 3.4 | 7.7 | 4.3 |
| present invention 4 | 150 | 10 | 2 | 31 | 500 | 0.4 | 0.8 | 17 | 0.4 | 6.3 |
| on the market 1 | | | 3 | 20 | 510 | 4.1 | 1.2 | 21 | 15 | 3 |
| on the market 2 | | | 3 | 25 | 631 | 4.1 | 0.3 | 550 | 0.8 | 10 |
| on the market 3 | | | 28 | 24 | 454 | 2.7 | 3.4 | 14 | 1.5 | 3.7 |
| on the market 4 | | | 12 | 18 | 555 | 0.6 | 0.7 | 9.9 | 5.6 | 4.8 |
| on the market 5 | | | 177 | 22 | 528 | 9.4 | 7.9 | 13 | 7.6 | 31 |
| on the market 6 | | | 208 | 15 | 569 | 4.8 | 7.3 | 5.1 | 7.3 | 16 |
| on the market 7 | | | 250 | 15 | 598 | 4.8 | 11 | 6.5 | 7.3 | 15 |
| on the market 8 | | | 52 | 30 | 538 | 5.3 | 6.6 | 9.6 | 2.9 | 46 |
| on the market 9 | | | 22.6 | 25 | 602 | 2.7 | 1.2 | 6 | 7 | 1≥ |

Example 17

Surface of the glove of the present invention and conventional sulfur/zinc crosslinked NBR glove is photographed by electronic microscope and compared with and results are shown in FIG. 16. Surface of the glove of the present invention is more slippery compared with that of conventional glove, and said fact is became the ground that contamination particles or metallic ion are removed easily from the glove.

APPLICABILITY FOR INDUSTRIAL USE

According to the present invention, elastomer which does not cause delayed IV type hypersensitivity can be provided. This fact can be applied to various products. Further, the crosslinking method indicated in the present invention can be used in various fields.

The invention claimed is:
1. A glove for clean room use formed from an elastomer that comprises 25-30 weight % of acrylonitrile, 62-71 weight % of butadiene and 4-8 weight % of unsaturated carboxylic acid (total 100 weight %) and that does not contain sulfur cross-linking agents or sulfur vulcanization accelerators, wherein:
  (i) the unsaturated carboxylic acid comprises a first fraction of substituents and a second fraction of substituents, the second fraction being residual with respect to the first fraction, the first fraction of substituents forming cross-links via bonds with each other, the second fraction of substituents forming cross-links via bonds with a bivalent metal;
  (ii) the elastomer had a Mooney viscosity $ML_{(1+4)}(100°C.)$ of 100-220 after formation of the cross-links of the first fraction of substituents and before formation of the cross-links of the second fraction of substituents;
  (iii) the glove has been prepared from the elastomer without use of sulfur cross-linking agents or sulfur vulcanization accelerators;
  (iv) the glove comprises an inner surface for contacting a hand of a user and an outer surface for contacting an object during use;
  (v) the inner surface has been processed by washing with water after a chlorine treatment of the inner surface, resulting in the inner surface having decreased tackiness;
  (vi) the outer surface has been processed by washing with pure water after a chlorine treatment of the outer surface, resulting in (a) elution of metal or metallic salt impurities and removal of contamination particles from the glove and (b) the outer surface having increased smoothness; and
  (vii) thickness of the glove is 0.05-0.15 mm, glove swelling ratio at formation of the glove is 240-320, tensile stress of the glove is 22-35 MPa, elongation to break of the glove is 480-620% and tensile stress at 500% elongation of the glove is 15-35 MPa.
2. The glove for clean room use of claim 1, wherein when contained metal migration in the glove is measured by an eluting amount of water, a total amount of Na, K, Ca, and Zn extracted from the glove after placing the glove into water for one hour is 7.8 μg to 18.6 μg.
3. The glove for clean room use of claim 1, wherein when contained metal migration in the glove is measured by an eluting amount of water, a total amount of Na and K extracted from the glove after placing the glove into water for one hour is 1.2 μg to 3.9 μg.
4. A glove for clean room use formed from elastomer that comprises 25-30 weight % of acrylonitrile, 62-71 weight % of butadiene and 4-8 weight % of unsaturated carboxylic acid (total 100 weight %) and that does not contain sulfur cross-linking agents or sulfur vulcanization accelerators, wherein;
  (i) the unsaturated carboxylic acid comprises a first fraction of substituents and a second fraction of substituents, the second fraction being residual with respect to the first fraction, the first fraction of substituents forming cross-links via bonds with each other, the second fraction of substituents forming cross-links via bonds with a bivalent metal;
  (ii) the elastomer had a Mooney viscosity $ML_{(1+4)}(100°C.)$ of 100-220after formation of the cross-links of the first fraction of substituents and before formation of the cross-links of the second fraction of substituents;
  (iii) the glove has been prepared from the elastomer without use of sulfur cross-linking agents or sulfur vulcanization accelerators;
  (iv) the glove comprises an inner surface for contacting a hand of a user and an outer surface for contacting an object during use;
  (v) the inner surface has been processed by washing with water after a chlorine treatment of the inner surface, resulting in the inner surface having decreased tackiness;

(vi) the outer surface has been processed by washing with pure water after a chlorine treatment of the outer surface, resulting in (a) elution of metal or metallic salt impurities and removal of contamination particles from the glove and (b) the outer surface having increased smoothness;

(vii) thickness of the glove is 0.05-0.15 mm, glove swelling ratio at formation of the glove is 240-320, tensile stress of the glove is 22-35 MPa, elongation to break of the glove is 480-620% and tensile stress at 500% elongation of the glove is 15-35 MPa; and (viii) the glove has been formed by processes comprising, (a) process to wash and dry a mold or a former (b) process to dip the mold or the former into solution of coagulant containing 8-17 weight % of $Ca^{2+}$ ion (c) process to dry the mold or the former to which coagulant is stuck at 50-70° C.

(d) process to dip the mold or the former obtained in (c) process to which coagulant is stuck into composition which produces elastomer for 1-20 seconds under temperature condition of 25-35° C.

(e) process to remove agents by washing (leaching process)

(f) beading process (sleeve winding process)

(g) drying process of the glove former at 80-120° C. for 250-300 seconds (h) process to crosslink and harden the composition for produce elastomer stuck on the surface of the mold or the former at 120-150° C. for 20-30 minutes (i) process to dry after post leaching of the mold or the former obtained in (h) process (j) process to treat the surface of elastomer film obtained in (h) process by chlorine and to treat for neutralization (k) process to wash and dry the film of elastomer which is obtained in (j) process (l) process to detach chlorine treated elastomer film from the mold or former and to turn it over, and the processes further comprising (m) process to treat the turned over glove by chlorine (n) process to wash the glove whose outside is chlorinated in said (m) process by pure water and to dry.

5. The glove for clean room use of claim 4, wherein the inner surface of the glove is subjected to chlorine treatment by (j) process, with a concentration of chlorine 50 ppm to 200 ppm, further the outer surface of the glove is subjected to chlorine treatment by (m) process, with a concentration of chlorine 30 ppm to 180 ppm.

6. The glove for clean room use of claim 5, wherein chlorine treatment by (m) process is carried out with a concentration of chlorine 50 ppm to 100 ppm in aqueous solution.

* * * * *

UNITED STATES PATENT AND TRADEMARK OFFICE
CERTIFICATE OF CORRECTION

| | | |
|---|---|---|
| PATENT NO. | : 9,326,557 B2 | Page 1 of 1 |
| APPLICATION NO. | : 13/877054 | |
| DATED | : May 3, 2016 | |
| INVENTOR(S) | : Siong Hui Khoo et al. | |

It is certified that error appears in the above-identified patent and that said Letters Patent is hereby corrected as shown below:

In the specification,

Column 22, line 18, "Ca+ ion" should be --$Ca^{2+}$ ion--.

Column 36, Table 16, under 100 v/v%, the column heading "2" that is not circled should be circled.

Signed and Sealed this
Twelfth Day of July, 2016

Michelle K. Lee
*Director of the United States Patent and Trademark Office*